(12) United States Patent
Man et al.

(10) Patent No.: US 11,406,103 B2
(45) Date of Patent: *Aug. 9, 2022

(54) SANITIZING RINSE BASED ON QUAT-ANIONIC SURFACTANT SYNERGY

(71) Applicant: Ecolab USA Inc., Saint Paul, MN (US)

(72) Inventors: Victor Fuk-Pong Man, St. Paul, MN (US); Derrick Richard Anderson, Vadnais Heights, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,513

(22) Filed: Feb. 28, 2017

(65) Prior Publication Data

US 2017/0251663 A1    Sep. 7, 2017

Related U.S. Application Data

(60) Provisional application No. 62/398,642, filed on Sep. 23, 2016, provisional application No. 62/301,822, filed on Mar. 1, 2016.

(51) Int. Cl.
| | | |
|---|---|---|
| *A01N 33/12* | (2006.01) | |
| *C11D 1/65* | (2006.01) | |
| *C11D 10/04* | (2006.01) | |
| *A01N 25/22* | (2006.01) | |
| *A01N 25/30* | (2006.01) | |
| *C11D 3/48* | (2006.01) | |
| *C11D 1/04* | (2006.01) | |
| *C11D 1/62* | (2006.01) | |
| *C11D 1/06* | (2006.01) | |
| *C11D 1/14* | (2006.01) | |
| *C11D 1/29* | (2006.01) | |

(52) U.S. Cl.
CPC ............. *A01N 33/12* (2013.01); *A01N 25/22* (2013.01); *A01N 25/30* (2013.01); *C11D 1/65* (2013.01); *C11D 3/48* (2013.01); *C11D 10/047* (2013.01); *C11D 1/04* (2013.01); *C11D 1/06* (2013.01); *C11D 1/143* (2013.01); *C11D 1/146* (2013.01); *C11D 1/29* (2013.01); *C11D 1/62* (2013.01)

(58) Field of Classification Search
CPC ...... A01N 33/12; A01N 25/30; C11D 10/047; C11D 1/65; C11D 3/48; C11D 1/62; C11D 1/04
See application file for complete search history.

(56) References Cited

U.S. PATENT DOCUMENTS

| | | |
|---|---|---|
| 3,920,563 A | 11/1975 | Wixon |
| 4,272,395 A | 6/1981 | Wright |
| 4,320,147 A | 3/1982 | Schaeufele |
| 4,647,314 A | 3/1987 | Mullins et al. |
| 4,847,088 A | 7/1989 | Blank |
| 5,244,589 A * | 9/1993 | Liu ...................... C10M 129/40 508/449 |
| 5,389,685 A | 2/1995 | Smith et al. |
| 5,411,585 A | 5/1995 | Avery et al. |
| 5,454,984 A | 10/1995 | Graubart et al. |
| 5,545,749 A | 8/1996 | Smith et al. |
| 5,547,990 A | 8/1996 | Hall et al. |
| 5,573,710 A | 11/1996 | McDonell |
| 5,747,108 A | 5/1998 | Farooq et al. |
| 5,833,741 A | 11/1998 | Walker |
| 5,998,358 A | 12/1999 | Herdt et al. |
| 6,010,996 A | 1/2000 | Hu et al. |
| 6,017,561 A | 1/2000 | Zhou et al. |
| 6,121,219 A | 9/2000 | Herdt et al. |
| 6,136,769 A | 10/2000 | Asano et al. |
| 6,150,320 A | 11/2000 | McDonell et al. |
| 6,239,092 B1 | 5/2001 | Papasso et al. |
| 6,303,557 B1 | 10/2001 | Colclough |
| 6,310,013 B1 | 10/2001 | Lokkesmoe et al. |
| 6,339,054 B1 | 1/2002 | Levitt et al. |
| 6,350,725 B1 | 2/2002 | Levitt et al. |
| 6,387,870 B1 | 5/2002 | Klaers et al. |
| 6,464,764 B1 | 10/2002 | Lichtenberg et al. |
| 6,475,961 B2 | 11/2002 | Lokkesmoe et al. |

(Continued)

FOREIGN PATENT DOCUMENTS

| | | |
|---|---|---|
| CN | 1183268 A | 6/1998 |
| CN | 12762857 A | 4/2006 |

(Continued)

OTHER PUBLICATIONS

Ecolab USA Inc., PCT/US2017/019906, filed Feb. 28, 2017, "International Search Report" of the Israel Patent Office, dated Jun. 5, 2017.

Burdock, George A., correspondence regarding "Benzalkonium Chloride as a Component of Free N Clear™ GRAS Notification," mailed Sep. 6, 2013.

(Continued)

*Primary Examiner* — Shobha Kantamneni
(74) *Attorney, Agent, or Firm* — McKee, Voorhees & Sease PLC

(57) ABSTRACT

Rinse aids and sanitizing rinse aids for various applications, including institutional machine sanitizing are disclosed. In particular, concentrated and use compositions, such as concentrated liquid rinse aid compositions, employing a synergistic combination of a quaternary ammonium compound and anionic surfactant are disclosed. In particular, the present invention provides compositions and methods of a sanitizing rinse providing desired antimicrobial efficacy against a broad spectrum of gram negative microbes, suitable foaming profiles, and beneficial applications of use of the same, including low temperature sanitizing rinse are provided.

6 Claims, 17 Drawing Sheets

(56) References Cited

U.S. PATENT DOCUMENTS

| | | |
|---|---|---|
| 6,482,791 B2 | 11/2002 | Sano et al. |
| 6,525,005 B1 | 2/2003 | Kravitz et al. |
| 6,525,014 B1 | 2/2003 | Gorlin et al. |
| 6,583,181 B1 | 6/2003 | Chiang et al. |
| 6,602,350 B2 | 8/2003 | Levitt et al. |
| 6,627,657 B1 | 9/2003 | Hilgren et al. |
| 6,632,291 B2 | 10/2003 | Rabon et al. |
| 6,720,301 B2 | 4/2004 | Gorlin et al. |
| 6,730,648 B2 | 5/2004 | Gorlin et al. |
| 6,855,328 B2 | 2/2005 | Hei et al. |
| 6,864,220 B2 | 3/2005 | Levitt et al. |
| 6,878,681 B1 | 4/2005 | Gohl et al. |
| 6,924,260 B2 | 8/2005 | Aubay |
| 6,939,840 B2 | 9/2005 | Lichtenberg et al. |
| 7,482,315 B2 | 1/2009 | Levitt et al. |
| 7,601,681 B2 | 10/2009 | Smets et al. |
| 7,820,594 B2 | 10/2010 | Coleman |
| 7,951,245 B2 | 5/2011 | Levitt et al. |
| 8,003,369 B2 | 8/2011 | Yamaguchi et al. |
| 8,110,537 B2 | 2/2012 | Gohl et al. |
| 8,221,733 B2 | 7/2012 | Lichtenberg et al. |
| 8,246,906 B2 | 8/2012 | Hei et al. |
| 8,337,872 B2 | 12/2012 | Fuls et al. |
| 9,034,813 B2 | 5/2015 | Man et al. |
| 9,309,485 B2 | 4/2016 | Hunt, Jr. et al. |
| 9,410,110 B2 | 8/2016 | Man et al. |
| 10,206,392 B2 | 2/2019 | Kloeppel et al. |
| 10,285,400 B2 | 5/2019 | Lei et al. |
| 2002/0128169 A1 | 9/2002 | Levitt et al. |
| 2003/0029812 A1 | 2/2003 | Burns et al. |
| 2003/0114342 A1 | 6/2003 | Hall |
| 2003/0187073 A1 | 10/2003 | Lichtenberg et al. |
| 2003/0228992 A1 | 12/2003 | Smets et al. |
| 2004/0071653 A1 | 4/2004 | Bratescu et al. |
| 2004/0220275 A1 | 11/2004 | Lutzeler et al. |
| 2005/0014672 A1 | 1/2005 | Arif |
| 2005/0124723 A1 | 6/2005 | Fritschi et al. |
| 2006/0014655 A1 | 1/2006 | Smets et al. |
| 2006/0100119 A1 | 5/2006 | Smith |
| 2006/0128585 A1 | 6/2006 | Adair et al. |
| 2007/0155641 A1 | 7/2007 | Britton |
| 2007/0281002 A1 | 12/2007 | Morales et al. |
| 2008/0119527 A1 | 5/2008 | Baldo |
| 2008/0145390 A1 | 6/2008 | Taylor et al. |
| 2009/0149359 A1 | 6/2009 | Hundley et al. |
| 2010/0160201 A1 | 6/2010 | Scheuing et al. |
| 2010/0227930 A1 | 9/2010 | Lusignan |
| 2010/0256025 A1 | 10/2010 | Van Zanten et al. |
| 2011/0195131 A1 | 8/2011 | Bouchard et al. |
| 2011/0262892 A1 | 10/2011 | Aoyagi et al. |
| 2012/0070341 A1 | 3/2012 | Eder et al. |
| 2012/0252716 A1 | 10/2012 | Barnabas et al. |
| 2013/0137618 A1 | 5/2013 | Wood |
| 2013/0210923 A1 | 8/2013 | Zhu |
| 2013/0247308 A1 | 9/2013 | Duerrschmidt et al. |
| 2013/0255729 A1 | 10/2013 | Hodge et al. |
| 2014/0171512 A1 | 6/2014 | Kloeppel et al. |
| 2016/0295859 A1 | 10/2016 | Chan et al. |
| 2017/0251663 A1 | 9/2017 | Man et al. |
| 2017/0284605 A1 | 10/2017 | Janak et al. |
| 2017/0347644 A1 | 12/2017 | Silvernail et al. |
| 2020/0229435 A1 | 7/2020 | Malet et al. |
| 2020/0305437 A1 | 10/2020 | McGeechan et al. |

FOREIGN PATENT DOCUMENTS

| | | |
|---|---|---|
| CN | 102696599 A | 10/2012 |
| CN | 104521959 A | 4/2015 |
| CN | 105129931 A | 12/2015 |
| CN | 105145631 A | 12/2015 |
| CN | 108882703 A | 11/2018 |
| DE | 2530522 A1 | 1/1977 |
| DE | 2936121 A1 | 3/1981 |
| DE | 3503848 A1 | 8/1986 |
| DE | 10060534 A1 | 6/2002 |
| EP | 0180841 A1 | 5/1986 |
| EP | 0593250 A1 | 4/1994 |
| EP | 0639636 A2 | 2/1995 |
| EP | 0799570 A1 | 10/1997 |
| EP | 0843002 A2 | 5/1998 |
| EP | 0843002 A3 | 9/2001 |
| EP | 1277403 A1 | 1/2003 |
| EP | 1876225 A1 | 1/2008 |
| GB | 2172607 A | 9/1986 |
| JP | 61112002 A | 5/1986 |
| JP | 61272298 A | 12/1986 |
| JP | 7256266 A | 10/1995 |
| JP | 8259444 A | 10/1996 |
| JP | 10503235 A | 3/1998 |
| JP | 10512015 A | 11/1998 |
| JP | 11511786 A | 10/1999 |
| JP | 2000273004 A | 10/2000 |
| JP | 2002129189 A | 5/2002 |
| JP | 2002146400 A | 5/2002 |
| JP | 2002348593 A | 12/2002 |
| JP | 2004263013 A | 9/2004 |
| JP | 2006328170 A | 12/2006 |
| JP | 2007119753 A | 5/2007 |
| JP | 2008156521 A | 7/2008 |
| JP | 201037295 A | 2/2010 |
| JP | 2012158768 A | 8/2012 |
| JP | 201323642 A | 2/2013 |
| JP | 2013023642 A | 2/2013 |
| JP | 20145457 A | 1/2014 |
| JP | 2015507676 A | 3/2015 |
| JP | 2019508498 A | 3/2019 |
| WO | 9427436 A1 | 12/1994 |
| WO | 9728238 A1 | 8/1997 |
| WO | WO9728238 A1 | 8/1997 |
| WO | 9844791 A1 | 10/1998 |
| WO | 199845392 A1 | 10/1998 |
| WO | WO9844791 A1 | 10/1998 |
| WO | 9907331 A1 | 2/1999 |
| WO | 0035283 A1 | 6/2000 |
| WO | 0042137 A2 | 7/2000 |
| WO | 0049127 A1 | 8/2000 |
| WO | 0059696 A2 | 10/2000 |
| WO | 0119507 A1 | 3/2001 |
| WO | WO0119507 A1 | 3/2001 |
| WO | 200194517 A1 | 12/2001 |
| WO | 0221916 A2 | 3/2002 |
| WO | 03053144 A1 | 7/2003 |
| WO | 2008024090 A2 | 2/2008 |
| WO | 2008049616 A1 | 5/2008 |
| WO | 2011083295 A1 | 7/2011 |
| WO | 2015145100 A1 | 10/2015 |
| WO | 2017151552 A1 | 9/2017 |

OTHER PUBLICATIONS

Rajkowska, et al., "Quarternary Ammonium Biocides as Antimicrobial Agents Protecting Historical Wood and Brick," Acta Biochimica Polonica, Regular Paper, vol. 63, No. 1/2016, pp. 153-159, available on-line Dec. 3, 2015.

Boethling, Robert S., "Environmental Fate and Toxicity in Wastewater Treatment of Quaternary Ammonium Surfactants", Water Res. vol. 18, No. 9, pp. 1061-1076. Feb. 1984.

Tubajika, Kayimbi M., "Effectiveness of alkyl dimethyl benzyl ammonium chloride in reducing the population of *Xanthomonas campestris* pv. vesicatoria and *Pseudomonas syringae* pv. syringae in tomatoes, beans and peppers", Archives of Phytopathology and Plant Protection, pp. 688-697. Jun. 5, 2009.

Ecolab USA Inc., "Notification of Transmittal of the International Search Report and the Written Opinion of the International Searching Authority or the Declaration", issued in connection to PCT/US2017/019895, dated Jun. 15, 2017.

Ecolab USA Inc., "Notification of Transmittal of the International Search Report and the Written Opnion of the International Searching Authority, or the Declaration", issued in connection to PCT/US2017/019840, dated Jun. 8, 2017.

Boethling, Robert S. "Environmental Fate and Toxicity in Wastewater Treatment of Quaternary Ammonium Surfactants", Water Res. vol. 18, No. 18, No. 9, pp. 1061-1076. Feb. 1984.

(56) References Cited

OTHER PUBLICATIONS

Tubajika, Kayimbi M., "Effectiveness of alkyl dimethyl benzyl ammonium chloride in reducing the population of *Xanthomonas campestris* pv. vesicatoria and *Pseudomonas syringae* pv. syringae in tomatoes, beans and peppers", Archives of Phytopathology and Plant Protection, 5 pages, pp. 688-697, Jun. 5, 2009.
Ecolab USA Inc., in connection with PCT/US2017/019895 filed Feb. 28, 2017, "The International Search Report and the Written Opinion of the International Searching Authority, or the Declaration", 37 pages, dated Jun. 15, 2017.
Ecolab USA Inc., "International Search Report", issued in connection to PCT/US2017/019880 filed Feb. 28, 2017, dated Jun. 13, 2017.
Ecolab USA Inc. in connection with PCT/US2017/19840 filed Feb. 28, 2017, "The International Search Report and the Written Opinion of the International Searching Authority, or the Declaration", 16 pages, dated Jun. 8, 2017.
Ecolab USA Inc. in connection with PCT/US2017/019840 filed Feb. 28, 2019, "Extended European Search Report", 11 pages, dated Oct. 22, 2019.
Sütterlin et al., "The toxicity of the quaternary ammonium compound benzalkonium chloride alone and in mixtures with other anionic compounds to bacteria in test systems with Vibrio fischeri and Pseudomonas putida", Ecotoxicology and Environmental Safety, vol. 71, pp. 498-505, 2008.
"RN1643-20-5", www.cas.org/training/stn/database-specific, 2 pages, entered STN: Nov. 16, 1984.
Y.H. Hui, "Bailey's Oils and Fats Chemistry and Technology", Fifth Edition, vol. 5, China Light Industry Press, 2 pages, Jun. 30, 2001.
Yuan, Zhi, "Practical Cleaning Technology", Compilation Group of Practical Technician Technical Teaching Materials, Guangdong Science and Technology Press, 2 pages, Dec. 31, 2007.
Yun, Liu, "Detergent-Principle, Raw Materials, Process, Formulation", Chemical Industry Press, 2 pages, Sep. 30, 1998.
Zhicheng, Chang, "Oil Based Surfactant", China Light Industry Press, 2 pages, Apr. 30, 1998.

* cited by examiner

SANITIZING RINSE BASED ON QUAT-ANIONIC SURFACTANT SYNERGY

CROSS REFERENCE TO RELATED APPLICATIONS

This application is a non-provisional application claiming priority to U.S. Provisional Application Nos. 62/301,822, filed Mar. 1, 2016 and 62/398,642, filed Sep. 23, 2016, both of which are herein incorporated by reference in their entirety.

FIELD OF THE INVENTION

The present invention is related to the field of sanitizing rinse aids for various applications. The present invention is related to various forms of concentrated or use compositions, such as concentrated liquid rinse aid compositions, including sanitizing rinse aid compositions. The concentrated or use compositions are particularly suited for low foaming or non-foaming applications to beneficially provide desired rinsing pressure, and clean and fast drying. In particular, the present invention provides compositions and methods of a sanitizing rinse, including a synergistic combination of a quaternary ammonium compound and anionic surfactant.

BACKGROUND OF THE INVENTION

Antimicrobial agents are chemical compositions that are used to prevent microbiological contamination and deterioration of products, materials, and systems. Antimicrobial agents and compositions are used, for example, as disinfectants or sanitizers in association with hard surface cleaning, food preparation, animal feed, cooling water, hospitality services, hospital and medical uses, and pulp and paper manufacturing, and cleaning textiles. Of the diverse categories of antimicrobial agents and compositions, quaternary ammonium compounds represent one of the largest of the classes of agents in use. At low concentrations, quaternary ammonium type antimicrobial agents are bacteriostatic, fungistatic, algistatic, sporostatic, and tuberculostatic. At medium concentrations they are bactericidal, fungicidal, algicidal, and viricidal against lipophilic viruses. It is desirable to boost the antimicrobial activity of such chemicals for us in various applications.

Mechanical warewashing machines including dishwashers have been common in the institutional and household environments for many years. Such automatic warewashing machines clean dishes using two or more cycles which can include initially a wash cycle followed by a rinse cycle. Such automatic warewashing machines can also utilize other cycles, for example, a soak cycle, a pre-wash cycle, a scrape cycle, additional wash cycles, additional rinse cycles, a sanitizing cycle, and/or a drying cycle. Any of these cycles can be repeated, if desired and additional cycles can be used. Detergents and/or sanitizers are conventionally used in these warewashing applications to provide cleaning, disinfecting and/or sanitizing. Dishmachines can remove soil by using a combination of various detergents and/or sanitizers, temperatures, and/or mechanical action from water. In some aspects where a sanitizer is not employed, water is heated to provide sanitization of the ware, placing an increase utility demand on a ware wash machine.

In addition to detergents and sanitizers, rinse aids are also conventionally used in warewashing applications to promote drying and to prevent the formation of spots on the ware being washed. In order to reduce the formation of spotting, rinse aids have commonly been added to water to form an aqueous rinse that is sprayed on the ware after cleaning is complete. A number of rinse aids are currently known, each having certain advantages and disadvantages, such as those disclosed in U.S. Pat. Nos. 3,592,774, 3,625,901, 3,941,713, 4,005,024, 4,187,121, 4,147,559, 4,624,713. In addition, further disclosure of rinse additives including nonionic surfactants is disclosed in Schick, "Nonionic Surfactants", published by Marcel Dekker, and John L. Wilson, Soap and Chemical Specialties, February 1958, pp. 48-52 and 170-171, which is herein incorporated by reference in its entirety.

There remains an ongoing need for alternative and improved rinse aid compositions. There further remains an ongoing need for improved efficacy of dishmachines, including maximizing the efficacy of the combination of detergents, sanitizers and/or rinse aids formulations. In addition, there is a desire among consumers, both institutional and household, to reduce the utilities required for operating such dishmachines. It is against this background that the present disclosure is made to develop a combination sanitizing agent and rinse aid into a single, stable formulation.

Accordingly, it is an objective of the claimed invention to develop concentrated and use liquid compositions and methods of using the same for warewashing applications to provide desired a sanitizing rinse aid employing a quaternary ammonium compound, which are conventionally known to have undesirable efficacy against gram negative microbes, such as *E. coli*, and further limited by having inadequate sheeting performance on surfaces, leaving surfaces spotty and filmy.

It is a further object of the invention to provide a sanitizing rinse aid employing a quaternary ammonium compound effective at low temperature warewashing applications.

A further object of the invention is to provide a sanitizing rinse aid employing a quaternary ammonium compound having a synergistic activation in combination with a medium chain anionic surfactant.

Other objects, advantages and features of the present invention will become apparent from the following specification taken in conjunction with the accompanying drawings.

BRIEF SUMMARY OF THE INVENTION

An advantage of the invention is the synergistic activation of a quaternary ammonium compound by a medium chain anionic surfactant to provide a sanitizing rinse aid composition. Beneficially, the sanitizing rinse aid composition is suitable for use in both low and high temperature warewashing applications, including instutional machine sanitizing. An antimicrobial quaternary ammonium compound based formula is particularly well suited for low temperature and low foam applications including for example, auto-dish rinse aid and sanitizer combination product, or a 2-in-1 sanitizing rinse.

In some embodiments of the present invention, compositions and methods of making the same provide a sanitizing rinse composition containing a synergistic combination of a quaternary ammonium compound an anionic surfactant. In an aspect, the sanitizing rinse composition is provided including a silane free quaternary ammonium compound having less than a C20 chain length (R1, R2, R3 and R4) and in combination with an anionic surfactant preferably having C6-C18 chain length, which is linear, branched, or a mixture there of. In some aspects the anionic surfactant used in combination with the quaternary ammonium compound is alkoxylated or un-alkoxylated and may be a linear chain or branched chain carboxylate or sulfate/sulfonate. In a further aspect the anionic surfactant of the sanitizing rinse composition is a C6-C12 carboxylate. In an aspect, the sanitizing rinse composition has a use solution pH of 1-12, a pH between about 1 and about 8, or a pH between about 3 and about 8. In an aspect, the sanitizing rinse composition is substantially free of an oxidant and/or optionally free of nonionic surfactants.

In further embodiments, the quaternary ammonium compound used in the sanitizing rinse compositions of the invention is comprised of at least one dialkyl quaternary ammonium and the anionic surfactant may be octanoic acid, nonanoic acid, decanoic acid or a mixture thereof.

In further embodiments the sanitizing rinse composition is provided with a molar ratio of anionic surfactant to quaternary ammonium compound of about 1 mole anionic surfactant to about 1 mole of quaternary ammonium compound. In another embodiment the antimicrobial composition is provided with a molar ratio of anionic surfactant to quaternary ammonium compound of about 1 mole anionic surfactant to about 10 mole of quaternary ammonium compound. In another embodiment the antimicrobial composition is provided with a molar ratio of anionic surfactant to quaternary ammonium compound of about 5 mole anionic surfactant to about 1 mole of quaternary ammonium compound. In another embodiment the antimicrobial composition is provided with a molar ratio of anionic surfactant to quaternary ammonium compound of about 1 mole anionic surfactant to about 2 moles of quaternary ammonium compound. In another embodiment the antimicrobial composition is provided with a molar ratio of anionic surfactant to quaternary ammonium compound of about 2 moles anionic surfactant to about 1 mole of quaternary ammonium compound.

In an embodiment, the present invention provides a 2-in-1 sanitizing rinse composition. In a further embodiment, the present invention provides methods of employing the 2-in-1 sanitizing rinse composition. Methods of rinsing a surface or target and providing sanitizing antimicrobial efficacy is provided wherein the method includes applying to a substrate a combination of a quaternary ammonium compound and an anionic surfactant as disclosed according to the various embodiments of the invention. In an aspect, the combination provides at least 5 log kill.

In additional embodiments, an antimicrobial rinse aid composition comprises a quaternary ammonium compound wherein groups R1, R2, R3, and R4 each have less than a C18 chain length, and an anionic surfactant having a C6-C18 chain length, wherein the composition is a solid or liquid concentrate that is soluble in water, has a pH of 1-12 in a use solution, and is present at an amount effective to reduce the contact angle of the composition to less than about 30 degrees at a high or low temperature.

Methods of employing the composition are also included in the embodiments of the invention.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
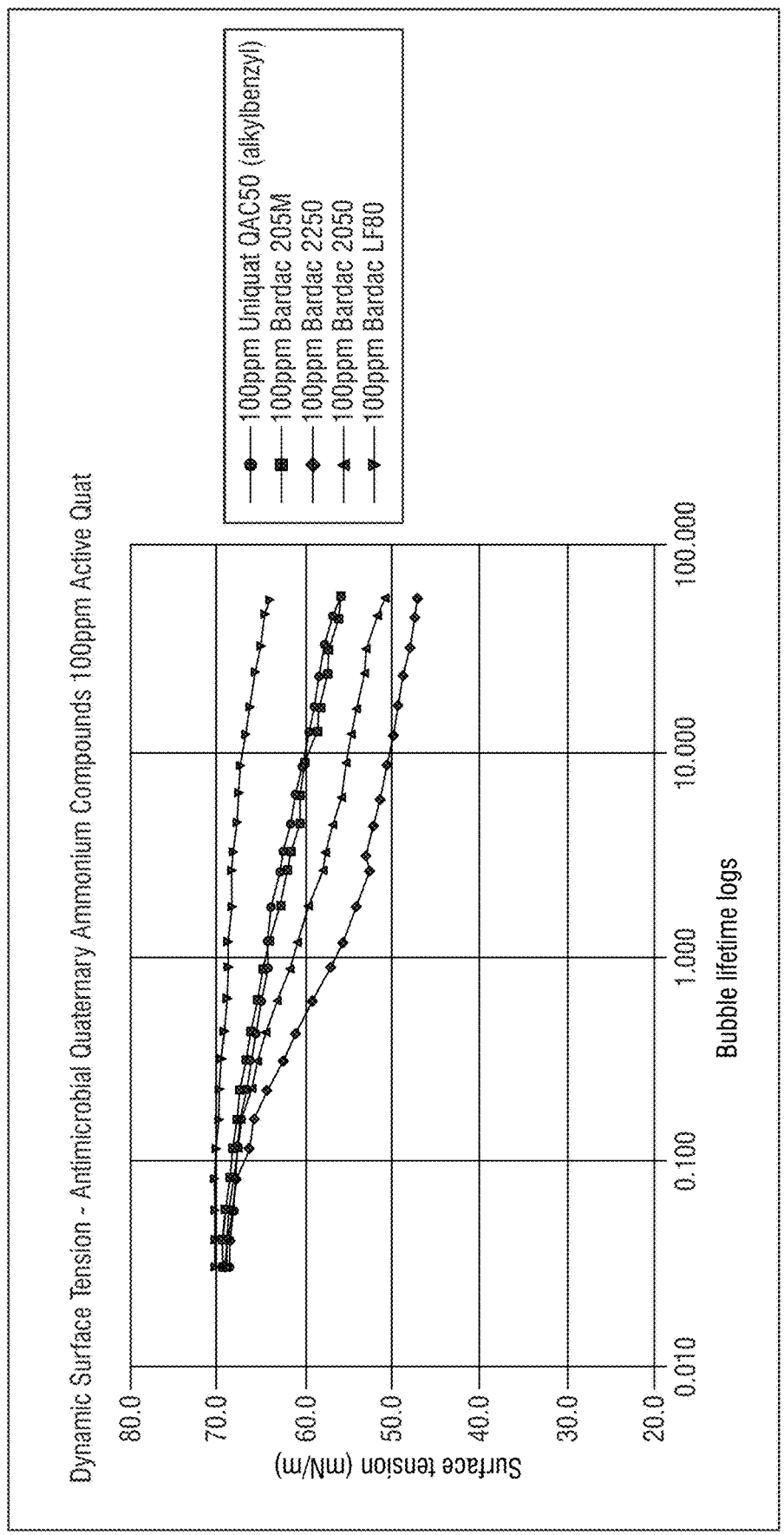
FIG. 1 shows a graphical depiction comparing the average dynamic surface tension of five quaternary ammonium compositions as described in Example 1.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

The embodiments of this invention are not limited to particular compositions, methods of making and/or methods of employing the same for rinsing and other applications, which can vary and are understood by skilled artisans. So that the invention may be more readily understood, certain terms are first defined. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms. According to embodiments of the invention, a sanitizing rinse provides a 99.999% reduction (5-log order reduction) of the desired organisms (including bacterial contaminants) at a use temperature. Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "surfactant" as used herein is a compound that contains a lipophilic segment and a hydrophilic segment, which when added to water or solvents, reduces the surface tension of the system.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

2-in-1 Sanitizing Rinse Compositions

According to the invention, the sanitizing rinse compositions combining at least one quaternary ammonium compound and at least one anionic surfactant (e.g. carboxylate-based anionic) provides improved antimicrobial activity than either of the components used alone. The sanitizing rinse compositions according to the invention beneficially provide synergistic surface activity (e.g. wettability), and moreover do not interfere with detergent performance, are low foaming (or non-foaming), provide efficacious sanitizing, and are cost effective. It has further been discovered that combinations of synergistic sanitizing efficacy also serve to reduce the unpleasant smell of certain anionic surfactants (e.g. C6-C10 carboxylated anionic surfactants), such as anionic fatty acids, providing a still further benefit of the compositions of the invention.

In an aspect, the sanitizing rinse compositions according to the invention comprise, consist of and/or consist essentially of a quaternary ammonium compound and an anionic surfactant. In another aspect, the sanitizing rinse compositions according to the invention comprise, consist of and/or consist essentially of a quaternary ammonium compound having each R group with a C20 or less chain length, and an anionic surfactant having a C10 or less chain length for linear or branched unalkoxylated carboxylates. In additional aspects employing alkoxylated anionic surfactant(s), higher alkyl chain lengths can be employed as described herein.

The 2-in-1 sanitizing rinse compositions according to the invention overcome the insufficient surface activity of the quaternary ammonium compounds while providing efficacious sanitizing capabilities. The complexes of quaternary ammonium compound and anionic surfactant become synergistically more surface active and efficacious, which beneficially provide improved performance under stressed conditions. Beneficially, the selection of the anionic surfactant and quaternary ammonium compound activate (i.e. cause synergy) the quaternary ammonium compound to provide desired surface activity. In an aspect, and without being limited to a particular mechanism of action, the anionic surfactant having a C10 or less chain length provides the activation suitable for providing a sanitizing rinse composition. This combination of quaternary ammonium compound and anionic surfactant having a desired anionic head group and chain length is a non-oxidative approach to enhancing the surface activity of and the antimicrobial efficacy of the quaternary ammonium compound complex in an unexpected manner.

EMBODIMENTS

Exemplary ranges of the 2-in-1 sanitizing rinse compositions in a concentrated liquid composition according to the invention are shown in Table 1 each in weight percentage.

TABLE 1

| Material | First Exemplary Range wt-% | Second Exemplary Range wt-% | Third Exemplary Range wt-% |
| --- | --- | --- | --- |
| Quaternary ammonium compound | 0.001-75 | 1-50 | 1-30 |
| Anionic surfactant | 0.0001-50 | 1-30 | 0.1-20 |
| Additional Functional Ingredients | 0-90 | 0-75 | 0-50 |

The 2-in-1 sanitizing rinse compositions according to the invention provide activation and synergy of the quaternary ammonium compound that are molar ratio dependent. In an aspect, the compositions include approximately a mole to mole ratio of quaternary ammonium compound and anionic surfactant. In other aspects, the compositions include up to about a 10 to about a 1 molar ratio of quaternary ammonium compound and anionic surfactant. In another embodiment the sanitizing rinse compositions are provided with a molar ratio of anionic surfactant to quaternary ammonium of about 1 mole anionic surfactant to about 1 mole of quaternary ammonium compound. In another embodiment the composition is provided with a molar ratio of anionic surfactant to quaternary ammonium compound of about 1 mole anionic surfactant to about 4 mole of quaternary ammonium compound. In another embodiment the antimicrobial composition is provided with a molar ratio of anionic surfactant to quaternary ammonium compound of about 1.5 mole anionic surfactant to about 1 mole of quaternary ammonium compound. In another embodiment the antimicrobial composition is provided with a molar ratio of anionic surfactant to quaternary ammonium compound of about 1 mole anionic surfactant to about 10 moles of quaternary ammonium compound. In another embodiment the antimicrobial composition is provided with a molar ratio of anionic surfactant to quaternary ammonium compound of about 2 moles anionic surfactant to about 1 mole of quaternary ammonium compound.

According to the invention, the concentrated 2-in-1 sanitizing rinse compositions set forth in Table 1 have any suitable pH for applications of use, including from about 1 to about 12. However, according to aspects of the invention, the diluted use solutions may have acidic or neutral to alkaline pH depending upon a particular application of use thereof and the desired non-corrosive nature of the rinse aid application, including form about 1 to about 12. In some aspects, such as applications of a solution in a ware wash machine, the compositions may have a pH from about 1 to about 12. In other aspects, the compositions of the invention have a pH between about 1 and about 8. In other aspects, the compositions of the invention have a pH between about 1 and about 5.5. Without limiting the scope of invention, the numeric ranges are inclusive of the numbers defining the range and include each integer within the defined range.

The 2-in-1 sanitizing and/or rinse compositions according to the invention can be provided in single use or multiple use compositions. In a preferred aspect, the composition is a concentrated liquid or solid composition. Various solids can be employed according to the invention and without limiting the scope of the invention. It should be understood that compositions and methods embodying the invention are suitable for preparing a variety of solid compositions, as for example, a cast, extruded, pressed, molded or formed solid pellet, block, tablet, and the like. In some embodiments, the solid composition can be formed to have a weight of 50 grams or less, while in other embodiments, the solid composition can be formed to have a weight of 50 grams or greater, 500 grams or greater, or 1 kilogram or greater.

Quaternary Ammonium Compound

The 2-in-1 sanitizing rinse compositions according to the invention include at least one quaternary ammonium compound. Certain quats are known to have antimicrobial activity. Accordingly, various quaternary ammonium compound with antimicrobial activity can be used in the composition of the invention. In an aspect, the quaternary ammonium compound is an antimicrobial "quat." The term "quaternary ammonium compound" or "quat" generally refers to any composition with the formula

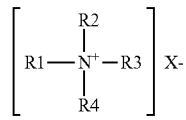

where R1-R4 are alkyl groups that may be alike or different, substituted or unsubstituted, saturated or unsaturated, branched or unbranched, and cyclic or acyclic and may contain ether, ester, or amide linkages; they may be aromatic or substituted aromatic groups. In an aspect, groups R1, R2, R3, and R4 each have less than a C20 chain length. X- is an anionic counterion. The term "anionic counterion" includes any ion that can form a salt with quaternary ammonium. Examples of suitable counterions include halides such as chlorides and bromides, propionates, methosulphates, saccharinates, ethosulphates, hydroxides, acetates, phosphates, carbonates (such as commercially available as Carboquat H, from Lonza), and nitrates. Preferably, the anionic counterion is chloride.

In some embodiments quaternary ammoniums having carbon chains of less than 20 are included in compositions of the invention. In other embodiments quaternary ammoniums having carbon chains of C6-C18, C12-C18, C12-C16 and C6-C10 are included in compositions of the invention. Examples of quaternary ammonium compounds useful in the present invention include but are not limited to alkyl dimethyl benzyl ammonium chloride, octyl decyl dimethyl ammonium chloride, dioctyl dimethyl ammonium chloride, and didecyl dimethyl ammonium chloride to name a few. A single quaternary ammonium or a combination of more than one quaternary ammonium may be included in compositions of the invention. Further examples of quaternary ammonium compounds useful in the present invention include but are not limited to benzethonium chloride, ethylbenzyl alkonium chloride, myristyl trimethyl ammonium chloride, methyl benzethonium chloride, cetalkonium chloride, cetrimonium bromide (CTAB), carnitine, dofanium chloride, tetraethyl ammonium bromide (TEAB), domiphen bromide, benzododecinium bromide, benzoxonium chloride, choline, cocamidopropyl betaine (CAPB), denatonium, and mixtures thereof. In an aspect, combinations of quaternary ammonium compounds are particularly preferred for compositions of the invention, such as for example the commercially-available products Bardac 205/208M.

In some embodiments depending on the nature of the R group, the anion, and the number of quaternary nitrogen atoms present, the antimicrobial quats may be classified into one of the following categories: monoalkyltrimethyl ammonium salts; monoalkyldimethylbenzyl ammonium salts; dialkyldimethyl ammonium salts; heteroaromatic ammonium salts; polysubstituted quaternary ammonium salts; bis-quaternary ammonium salts; and polymeric quaternary ammonium salts. Each category will be discussed herein.

Monoalkyltrimethyl ammonium salts contain one R group that is a long-chain alkyl group, and the remaining R groups are short-chain alkyl groups, such as methyl or ethyl groups. Some non-limiting examples of monoalkyltrimethyl ammonium salts include cetyltrimethylammonium bromide, commercial available under the tradenames Rhodaquat M242C/29 and Dehyquart A; alkyltrimethyl ammonium chloride, commercially available as Arquad 16; alkylaryltrimethyl ammonium chloride; and cetyldimethyl ethylammonium bromide, commercially available as Ammonyx DME.

Monoalkyldimethylbenzyl ammonium salts contain one R group that is a long-chain alkyl group, a second R group that is a benzyl radical, and the two remaining R groups are short-chain alkyl groups, such as methyl or ethyl groups. Monoalkyldimethylbenzyl ammonium salts are generally compatible with nonionic surfactants, detergent builders, perfumes, and other ingredients. Some non-limiting examples of monoalkyldimethylbenzyl ammonium salts include alkyldimethylbenzyl ammonium chlorides, commercially available as Barquat from Lonza Inc.; and benzethonium chloride, commercially available as Lonzagard, from Lonza Inc. Additionally, the monoalkyldimethylbenzyl ammonium salts may be substituted. Non-limiting examples of such salts include dodecyldimethyl-3,4-dichlorobenzyl ammonium chloride. Finally, there are mixtures of alkyldimethylbenzyl and alkyldimethyl substituted benzyl (ethylbenzyl) ammonium chlorides commercially available as BTC 2125M from Stepan Company, and Barquat 4250 from Lonza Inc.

Dialkyldimethyl ammonium salts contain two R groups that are long-chain alkyl groups, and the remaining R groups are short-chain alkyl groups, such as methyl groups. Some non-limiting examples of dialkyldimethyl ammonium salts include didecyldimethyl ammonium halides, commercially available as Bardac 22 from Lonza Inc.; didecyl dimethyl ammonium chloride commercially available as Bardac 2250 from Lonza Inc.; dioctyl dimethyl ammonium chloride, commercially available as Bardac LF and Bardac LF-80 from Lonza Inc.); and octyl decyl dimethyl ammonium chloride sold as a mixture with didecyl and dioctyl dimethyl ammonium chlorides, commercially available as Bardac2050 and 2080 from Lonza Inc.

Heteroaromatic ammonium salts contain one R group that is a long-chain alkyl group, and the remaining R groups are provided by some aromatic system. Accordingly, the quaternary nitrogen to which the R groups are attached is part of an aromatic system such as pyridine, quinoline, or isoquinoline. Some non-limiting examples of heteroaromatic ammonium salts include cetylpyridinium halide, commercially available as Sumquat 6060/CPC from Zeeland Chemical Inc.; 1-[3-chloroalkyl]-3,5,7-triaza-1-azoniaadamantane, commercially available as Dowicil 200 from The Dow Chemical Company; and alkyl-isoquinolinium bromide.

Polysubstituted quaternary ammonium salts are a monoalkyltrimethyl ammonium salt, monoalkyldimethylbenzyl ammonium salt, dialkyldimethyl ammonium salt, or heteroaromatic ammonium salt wherein the anion portion of the molecule is a large, high-molecular weight (MW) organic ion. Some non-limiting examples of polysubstituted quaternary ammonium salts include alkyldimethyl benzyl ammonium saccharinate, and dimethylethylbenzyl ammonium cyclohexylsulfamate.

Bis-quatemary ammonium salts contain two symmetric quaternary ammonium moieties having the general formula:

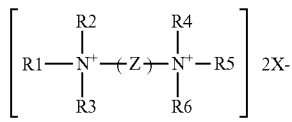

Where the R groups may be long or short chain alkyl, a benzyl radical or provided by an aromatic system. Z is a carbon-hydrogen chain attached to each quaternary nitrogen. Some non-limiting examples of bis-quaternary ammonium salts include 1,10-bis(2-methyl-4-aminoquinolinium chloride)-decane; and 1,6-bis[1-methyl-3-(2,2,6-trimethyl cyclohexyl)-propyldimethylammonium chloride] hexane or triclobisonium chloride.

In an aspect, the quaternary ammonium compound is a medium to long chain alkyl Rgroup, such as from 8 carbons to about 20 carbons, from 8 carbons to about 18 carbons, from about 10 to about 18 carbons, and from about 12 to about 16 carbons, and providing a soluble and good antimicrobial agent.

In an aspect, the quaternary ammonium compound is a short di-alkyl chain quaternary ammonium compound having an R group, such as from 2 carbons to about 12 carbons, from 3 carbons to about 12 carbons, or from 6 carbons to about 12 carbons.

In a preferred aspect, the quaternary ammonium compound is an alkyl benzyl ammonium chloride, a dialkyl benzyl ammonium chloride, a blend of alkyl benzyl ammonium chloride and dialkyl benzyl ammonium chloride, dodecyl dimethyl ammonium chloride, dioctyl dimethyl ammonium chloride, a blend of dodecyl dimethyl ammonium chloride and dioctyl dimethyl ammonium chloride, or mixtures thereof.

In some embodiments, the quaternary ammonium compound is silane free.

In a preferred embodiment, the quaternary ammonium compound may be selected based on its consideration or classification as a food additive. For example, the quaternary ammonium compound may include benzalkonium chloride and is therefore suitable for use in a sanitizing rinse for contact with food products.

An effective amount of the quaternary ammonium compound is provided in combination with the anionic surfactant to provide synergistic antimicrobial and sanitizing efficacy against a broad spectrum of microbes, including gram negative microbes such as E. coli. Suitable concentrations of the quaternary ammonium compound in a use solution include between about 50 ppm and about 400 ppm, or in softened (non-hard) water applications as low as about 25 ppm (as a result of the actives being inversely proportional to the calcium and temperature of the water). Additional suitable concentrations of the quaternary ammonium compound in a use solution include between about 1 ppm and about 10,000 ppm, 1 ppm and about 1,000 ppm, 5 ppm and about 400 ppm, 10 ppm and about 400 ppm, 20 ppm and about 400 ppm, 25 ppm and about 400 ppm, 50 ppm and about 400 ppm, 75 ppm and about 400 ppm, or 100 ppm and about 400 ppm. Beneficially, the low actives of the quaternary ammonium compound is a result of the beneficial synergy with the anionic surfactant. Without being limited according to the invention, all ranges recited are inclusive of the numbers defining the range and include each integer within the defined range.

According to embodiments of the invention, the quaternary ammonium compound may be provided in a concentrated composition in the amount between about 0.001 wt.-%-75 wt.-%, from about 0.1 wt.-%-75 wt.-%, from about 0.01 wt.-%-75 wt.-%, from about 1 wt.-%-75 wt.-%, from about 1 wt.-%-50 wt.-%, from about 1 wt.-%-30 wt.-%, from about 5 wt.-%-30 wt.-%. In addition, without being limited according to the invention, all ranges recited are inclusive of the numbers defining the range and include each integer within the defined range.

Anionic Surfactants

The 2-in-1 sanitizing rinse compositions according to the invention include at least one anionic surfactant. In other aspects, the 2-in-1 sanitizing rinse compositions according to the invention include at least two anionic surfactants. Anionic surfactants are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are polar (hydrophilic) solubilizing groups found in anionic surfactants.

In an aspect, the anionic surfactant is linear or branched. In an aspect, the linear or branched anionic surfactant is a medium chain surfactant having from 6-18 carbon chain length, preferably from 6-12 carbon chain length, and more preferably from 6-10 carbon chain length. In an aspect, the linear or branched, medium chain anionic surfactant is alkoxylated. In an aspect, the linear or branched anionic surfactant is an alkoxylated medium chain surfactant having from 6-18 carbon chain length, preferably from 6-13 carbon chain length, and more preferably from 6-10 carbon. In an aspect, the anionic surfactant is a carboxylate. In an alternative aspect, the anionic surfactant is a weak acid anionic, such as a phosphate ester. In a still further alternative aspect, the anionic surfactant is a sulfonate and/or sulfate.

In an aspect, the anionic surfactant suitable for use in the present compositions include carboxylates. Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like Suitable carboxylic acids include for example decanoic acid, octanoic acid, nonanoic, ethylhexyl acid, and isononanionic acid. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula: R—O—(CH$_2$CH$_2$O)$_n$(CH$_2$)$_m$—CO$_2$X in which R is a C8-C22 alkyl group or

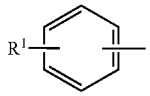

in which R.sup.1 is a C4-C16 alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a C8-C16 alkyl group. In some embodiments, R is a C12-C14 alkyl group, n is 4, and m is 1.

Such alkyl and alkylaryl ethoxy carboxylates are commercially available. These ethoxy carboxylates are typically available as the acid forms, which can be readily converted to the anionic or salt form.

In an aspect, the anionic surfactant suitable for use in the present compositions include phosphate esters.

In an aspect, the anionic surfactant suitable for use in the present compositions include sulfonates and/or sulfates. In an aspect, the anionic surfactant suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the C5-C17 acyl-N—(C1-C4 alkyl) and —N—(C1-C2 hydroxyalkyl) glucamine sulfates, and sulfates of alkylpolysaccharides such as the sulfates of alkylpolyglucoside, and the like. Also included are the alkyl sulfates, alkyl poly (ethyleneoxy) ether sulfates and aromatic poly(ethyleneoxy) sulfates such as the sulfates or condensation products of ethylene oxide and nonyl phenol (usually having 1 to 6 oxyethylene groups per molecule). Anionic sulfonate surfactants suitable for use in the present compositions also include alkyl sulfonates, the linear and branched primary and secondary alkyl sulfonates, and the aromatic sulfonates with or without substituents.

Examples of anionic carboxylate surfactants suitable for use in the 2-in-1 sanitizing rinse compositions include organic acids such as hexanoic acid, heptanoic acid, octanoic acid, nonanoic acid, and decanoic acid. Examples of branched chain organic acids suitable for use in the 2-in-1 sanitizing rinse compositions include ethylhexyl carboxylate, isononanoic carboxylate, and tridecyl carboxylate. Examples of commercially available surfactants suitable for use in the 2-in-1 sanitizing rinse compositions include organic acids such as hexanoic acid, heptanoic acid, octanoic acid, nonanoic acid, decanoic acid, Colatrope INC, Isononanionic acid, Marlowet 4539 (C9-alcohol polyethylene glycol ether carboxylic acid available from Sasol), Emulsogen CNO (C8-alcohol 8 moles polyethylene glycol ether carboxylic acid available from Clariant), and Emulsogen DTC (C13-alcohol 7 moles polyethylene glycol ether carboxylic acid available from Clariant). It is further discovered according to the invention that phosphate esters serve to enhance the antimicrobial activity of a quaternary ammonium compound and are therefore suitable for use in the 2-in-1 sanitizing rinse compositions.

An effective amount of the anionic surfactant is provided in combination with the quaternary ammonium compound to provide synergistic antimicrobial and/or sanitizing efficacy. Suitable concentrations of the anionic surfactant in a use solution include between about 1 ppm and about 5,000 ppm, about 15 ppm and about 2,500 ppm, about 1 ppm and about 1,000 ppm, about 1 ppm and about 100 ppm, about 1 ppm and about 50 ppm, or about 1 ppm and about 25 ppm. Without being limited according to the invention, all ranges recited are inclusive of the numbers defining the range and include each integer within the defined range.

According to embodiments of the invention, the anionic surfactant may be provided in a concentrated composition in the amount between about 0.0001 wt.-%-50 wt.-%, from about 0.001 wt.-%-50 wt.-%, from about 0.01 wt.-%-50 wt.-%, from about 0.1 wt.-%-50 wt.-%, from about 0.1 wt.-%-30 wt.-%, from about 1 wt.-%-30 wt.-%, from about 0.1 wt.-%-20 wt.-%, or from about 1 wt.-%-20 wt.-%. In addition, without being limited according to the invention, all ranges recited are inclusive of the numbers defining the range and include each integer within the defined range.

Additional Optional Ingredients

The components of the compositions can further be combined with various functional components. In some embodiments, the compositions including the quaternary ammonium compounds and anionic surfactants make up a large amount, or even substantially all of the total weight of the composition. For example, in some embodiments few or no additional functional ingredients are disposed therein. In other embodiments, additional functional ingredients may be included in the compositions. The functional ingredients provide desired properties and functionalities to the compositions. For the purpose of this application, the term "functional ingredient" includes a material that when dispersed or dissolved in the aqueous use solution provides a beneficial property in a particular use. Some particular examples of functional materials are discussed in more detail below, although the particular materials discussed are given by way of example only, and that a broad variety of other functional ingredients may be used.

In some embodiments, the compositions may include additional functional ingredients including, for example, additional surfactants, including nonionic surfactants, thickeners and/or viscosity modifiers, solvents, solubility modifiers, humectants, metal protecting agents, stabilizing agents, corrosion inhibitors, sequestrants and/or chelating agents, solidifying agent, sheeting agents, pH modifying components, including alkalinity and/or acidity sources, aesthetic enhancing agents (i.e., colorants, odorants, or perfumes), other cleaning agents, hydrotropes or couplers, buffers, and the like.

According to embodiments of the invention, the anionic polymer or chelant may be provided in a concentrated composition in the amount between about 0.0001 wt.-%-50 wt.-%, from about 0.001 wt.-%-50 wt.-%, from about 0.01 wt.-%-50 wt.-%, from about 0.1 wt.-%-50 wt.-%, from about 0.1 wt.-%-30 wt.-%, from about 1 wt.-%-30 wt.-%, from about 0.1 wt.-%-20 wt.-%, or from about 1 wt.-%-20 wt.-%. In addition, without being limited according to the invention, all ranges recited are inclusive of the numbers defining the range and include each integer within the defined range.

In some embodiments, the compositions of the invention do not include nonionic surfactants, providing an unexpected benefit of a sanitizing rinse aid employing the quaternary ammonium compound and an anionic surfactant, without the inclusion of a nonionic surfactant for wetting, sheeting and/or rinsing characteristics. Instead, the unexpected benefit of the invention is the surface activity as a result of the biocidal agent employed, namely the quaternary ammonium compound. This is an unexpected benefit as it is counterintuitive to provide a rinse aid employing the quaternary ammonium compound and anionic surfactant. Additionally, the compositions can be used in conjunction with one or more conventional cleaning agents, e.g., an alkaline detergent.

Alkalinity and/or Acidity Source

In some embodiments, the compositions of the present invention include an alkalinity source and/or acidulant. In a preferred embodiment, the compositions of the present invention include an acidulant. The acidulant can be effective to form a concentrate composition or a use solution with a desired acidic to neutral pH. The acidulant can be effective to form a use composition with pH of about 7, about 6 or less, about 5 or less, about 4, about 4 or less, about 3, about 3 or less, about 2, about 2 or less, or the like. In some embodiments, depending on the anionic surfactant employed in the composition, an acidulant is included in the composition. In an embodiment, an acidulant is employed in combination with linear short chain carboxylates (e.g. pH 3-5) and/or for branched/alkoxylated carboxylates having a broader pH.

In an embodiment, the acidulant includes an inorganic acid. Suitable inorganic acids include, but are not limited to, sulfuric acid, sodium bisulfate, phosphoric acid, nitric acid, hydrochloric acid. In some embodiments, the acidulant includes an organic acid. Suitable organic acids include, but are not limited to, methane sulfonic acid, ethane sulfonic acid, propane sulfonic acid, butane sulfonic acid, xylene sulfonic acid, benzene sulfonic acid, formic acid, acetic acid, mono, di, or tri-carboxylic acids (succinic, citric), picolinic acid, dipicolinic acid, and mixtures thereof. In some embodiments, the compositions of the present invention are free or substantially free of a phosphorous based acid. In some embodiments, acidulant selected can also function as a stabilizing agent. Thus, the compositions of the present invention can be substantially free of an additional stabilizing agent.

In certain embodiments, the present composition includes about 0 to about 80 wt-% acidulant, about 0.5 wt-% to about 80 wt-% acidulant, about 0.1 to about 50 wt %, about 1 to about 50 wt %, or about 5 to about 30 wt-% acidulant. It is to be understood that all values and ranges between these values and ranges are encompassed by the compositions of the present invention.

Stabilizing Agents

In some embodiments, the compositions of the present invention include one or more stabilizing agents. In some embodiments, an acidic stabilizing agent can be used. Thus, in some embodiments, the compositions of the present invention can be substantially free of an additional acidulant. Suitable stabilizing agents include, for example, chelating agents or sequestrants. Suitable sequestrants include, but are not limited to, organic chelating compounds that sequester metal ions in solution, particularly transition metal ions. Such sequestrants include organic amino- or hydroxy-polyphosphonic acid complexing agents (either in acid or soluble salt forms), carboxylic acids (e.g., polymeric polycarboxylate), hydroxycarboxylic acids, aminocarboxylic acids, or heterocyclic carboxylic acids, e.g., pyridine-2, 6-dicarboxylic acid (dipicolinic acid).

In some embodiments, the compositions of the present invention include dipicolinic acid as a stabilizing agent. Compositions including dipicolinic acid can be formulated to be free or substantially free of phosphorous. It has also been observed that the inclusion of dipicolinic acid in a composition of the present invention aids in achieving the phase stability of the compositions, compared to other conventional stabilizing agents, e.g., 1-hydroxy ethylidene-1,1-diphosphonic acid ($CH_3C(PO_3H_2)_2OH$) (HEDP).

In other embodiments, the sequestrant can be or include phosphonic acid or phosphonate salt. Suitable phosphonic acids and phosphonate salts include HEDP; ethylenediamine tetrakis methylenephosphonic acid (EDTMP); diethylenetriamine pentakis methylenephosphonic acid (DTPMP); cyclohexane-1,2-tetramethylene phosphonic acid; amino[tri(methylene phosphonic acid)]; (ethylene diamine[tetra methylene-phosphonic acid)]; 2-phosphene butane-1,2,4-tricarboxylic acid; or salts thereof, such as the alkali metal salts, ammonium salts, or alkyloyl amine salts, such as mono, di, or tetra-ethanolamine salts; picolinic, dipicolinic acid or mixtures thereof. In some embodiments, organic phosphonates, e.g, HEDP are included in the compositions of the present invention. Commercially available food additive chelating agents include phosphonates sold under the trade name DEQUEST® including, for example, 1-hydroxyethylidene-1, 1-diphosphonic acid, available from Monsanto Industrial Chemicals Co., St. Louis, Mo., as DEQUEST® 2010; amino(tri(methylenephosphonic acid)), ($N[CH_2PO_3H_2]_3$), available from Monsanto as DEQUEST® 2000; ethylenediamine[tetra(methylenephosphonic acid)] available from Monsanto as DEQUEST® 2041; and 2-phosphonobutane-1,2,4-tricarboxylic acid available from Mobay Chemical Corporation, Inorganic Chemicals Division, Pittsburgh, Pa., as Bayhibit AM.

The sequestrant can be or include aminocarboxylic acid type sequestrant. Suitable aminocarboxylic acid type sequestrants include the acids or alkali metal salts thereof, e.g., amino acetates and salts thereof. Suitable aminocarboxylates include N-hydroxyethylaminodiacetic acid; hydroxyethylenediaminetetraacetic acid, nitrilotriacetic acid (NTA); ethylenediaminetetraacetic acid (EDTA); N-hydroxyethyl-ethylenediaminetriacetic acid (HEDTA); diethylenetriaminepentaacetic acid (DTPA); and Alanine-N,N-diacetic acid; and the like; and mixtures thereof.

The sequestrant can be or include a polycarboxylate. Suitable polycarboxylates include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, polymaleic acid, polyfumaric acid, copolymers of acrylic and itaconic acid, phosphino polycarboxylate, acid or salt forms thereof, mixtures thereof, and the like.

In certain embodiments, the present composition includes about 0 to about 10 wt-% stabilizing agent, about 0.01 to about 10 wt-% stabilizing agent, about 0.4 to about 4 wt-% stabilizing agent, about 0.6 to about 3 wt-% stabilizing agent, about 1 to about 2 wt-% stabilizing agent. It is to be understood that all values and ranges within these values and ranges are encompassed by the present invention.

Wetting or Defoaming Agents

Also useful in the compositions of the invention are wetting and defoaming agents. Wetting agents function to increase the surface contact or penetration activity of the antimicrobial composition of the invention. Wetting agents which can be used in the composition of the invention include any of those constituents known within the art to raise the surface activity of the composition of the invention. In aspects of the invention various quaternary ammonium compounds are suitable for the rinse aid and sanitizing rinse aid application without the use of further defoamers in the formulation. In other embodiments employing commercially-available quaternary ammonium compounds, a defoamer is preferred in the composition or in combination with the composition, such as for example compositions employing Bardac 2250, Bardac MB50, and Bardac 205M.

Generally, defoamers which can be used in accordance with the invention preferably include alcohol alkoxylates and EO/PO block copolymers. In some embodiments, the compositions of the present invention can include antifoaming agents or defoamers which are of food grade quality given the application of the method of the invention. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. Commercial defoamers commonly available include silicones such as Ardefoam® from Armour Industrial Chemical Company which is a silicone bound in an organic emulsion; Foam Kill® or Kresseo® available from Krusable Chemical Company which are silicone and non-silicone type defoamers as well as silicone esters; and Anti-Foam A® and DC-200 from Dow Corning Corporation which are both food grade type silicones among others. These defoamers can be present at a concentration range from about 0.01 wt-% to 20 wt-%, 0.01 wt-% to 20 wt-%, from about 0.01 wt-% to 5 wt-%, or from about 0.01 wt-% to about 1 wt-%.

Thickening or Gelling Agents

The compositions of the present invention can include any of a variety of known thickeners. Suitable thickeners include natural gums such as xanthan gum, guar gum, or other gums from plant mucilage; polysaccharide based thickeners, such as alginates, starches, and cellulosic polymers (e.g., carboxymethyl cellulose); polyacrylates thickeners; and hydrocolloid thickeners, such as pectin. In an embodiment, the thickener does not leave contaminating residue on the surface of an object. For example, the thickeners or gelling agents can be compatible with food or other sensitive products in contact areas. Generally, the concentration of thickener employed in the present compositions or methods will be dictated by the desired viscosity within the final composition. However, as a general guideline, the viscosity of thickener within the present composition ranges from about 0.1 wt-% to about 5 wt-%, from about 0.1 wt-% to about 1.0 wt-%, or from about 0.1 wt-% to about 0.5 wt-%.

Additional Surfactants

The sanitizing rinse compositions according to the invention may include additional surfactants. In a particular aspect, nonionic surfactants are particularly useful for applications of use requiring additional defoaming. In an aspect, it is beneficial the sanitizing and rinse compositions do not require formulation with the nonionic surfactant for low-foaming surface activity. However, in some aspects, a nonionic surfactant may be desired in combination with the compositions of the invention (such as included in a detergent formulation employed in combination therewith). For example, in certain embodiments, such as food soil defoaming applications, a nonionic surfactant may be desirable to preferably include alcohol alkoxylates and EO/PO block copolymers.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and poly-butylene oxide condensates of alkyl phenols. Examples of commercial compounds of this chemistry are available on the market under the trade names Igepal® manufactured by Rhodia and Triton® manufactured bow Chemical Company.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Sasol North America Inc.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics® are manufactured by BASF Corporation under the trade name Pluronic® R surfactants. Likewise, the Tetronic®R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

The alkylphenoxypolyethoxyalkanols of U.S. Pat. No. 2,903,486 issued Sep. 8, 1959 to Brown et al. and represented by the formula

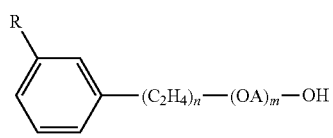

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n (C_2H_4)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n (C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n (C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or —$(C_2H_4O)_xH$, where x is in the range of from 1 to 3.

A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}$—$(PO)_sN$-$(EO)_tH$, $R^{20}$—$(PO)_sN$-$(EO)_tH(EO)_uH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic® PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

Amine oxides are tertiary amine oxides corresponding to the general formula:

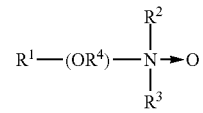

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

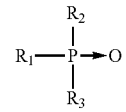

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

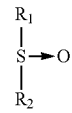

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic® and reverse Pluronic® surfactants; alcohol alkoxylates, such as Dehypon® LS-54 (R-(EO)$_5$(PO)$_4$) and Dehypon® LS-36 (R-(EO)$_3$(PO)$_6$); and capped alcohol alkoxylates, such as Plurafac® LF221 and Tegoten® EC11; mixtures thereof, or the like.

Sequestrants

The composition can contain an organic or inorganic sequestrant or mixtures of sequestrants. Organic sequestrants such as sodium citrate, the alkali metal salts of nitrilotriacetic acid (NTA), dicarboxymethyl glutamic acid tetrasodium salt (GLDA), EDTA, alkali metal gluconates, polyelectrolytes such as a polyacrylic acid, and the like can be used herein. The most preferred sequestrants are organic sequestrants such as sodium gluconate due to the compatibility of the sequestrant with the formulation base. The present invention can also incorporate sequestrants to include materials such as, complex phosphate sequestrants, including sodium tripolyphosphate, sodium hexametaphosphate, and the like, as well as mixtures thereof. Phosphates, the sodium condensed phosphate hardness sequestering agent component functions as a water softener, a cleaner, and a detergent builder. Alkali metal (M) linear and cyclic condensed phosphates commonly have a $M_2O:P_2O_5$ mole ratio of about 1:1 to 2:1 and greater. Typical polyphosphates of this kind are the preferred sodium tripolyphosphate, sodium hexametaphosphate, sodium metaphosphate as well as corresponding potassium salts of these phosphates and mixtures thereof. The particle size of the phosphate is not critical, and any finely divided or granular commercially available product can be employed.

Solidification Agents or Hardening Agents

If it is desirous to prepare compositions of the invention as a solid, a solidification agent may be included into the composition. In some embodiments, the solidification agent can form and/or maintain the composition as a solid rinse aid composition. In other embodiments, the solidification agent can solidify the composition without unacceptably detracting from the eventual release of the active ingredients. The solidification agent can include, for example, an organic or inorganic solid compound having a neutral inert character or making a functional, stabilizing or detersive contribution to the present composition. Suitable solidification agents include solid polyethylene glycol (PEG), solid polypropylene glycol, solid EO/PO block copolymer, amide, urea (also known as carbamide), nonionic surfactant (which can be employed with a coupler), anionic surfactant, starch that has been made water-soluble (e.g., through an acid or alkaline treatment process), cellulose that has been made water-soluble, inorganic agent, poly(maleic anhydride/methyl vinyl ether), polymethacrylic acid, other generally functional or inert materials with high melting points, mixtures thereof, and the like.

Suitable glycol solidification agents include a solid polyethylene glycol or a solid polypropylene glycol, which can, for example, have molecular weight of about 1,400 to about 30,000. In certain embodiments, the solidification agent includes or is solid PEG, for example PEG 1500 up to PEG 20,000. In certain embodiments, the PEG includes PEG 1450, PEG 3350, PEG 4500, PEG 8000, PEG 20,000, and the like. Suitable solid polyethylene glycols are commercially available from Union Carbide under the tradename CARBOWAX.

Suitable amide solidification agents include stearic monoethanolamide, lauric diethanolamide, stearic diethanolamide, stearic monoethanol amide, cocodiethylene amide, an alkylamide, mixtures thereof, and the like. In an embodiment, the present composition can include glycol (e.g., PEG) and amide.

Suitable inorganic solidification agents include phosphate salt (e.g., alkali metal phosphate), sulfate salt (e.g., magnesium sulfate, sodium sulfate or sodium bisulfate), acetate salt (e.g., anhydrous sodium acetate), Borates (e.g., sodium borate), Silicates (e.g., the precipitated or fumed forms (e.g., Sipernat 50® available from Degussa), carbonate salt (e.g., calcium carbonate or carbonate hydrate), other known hydratable compounds, mixtures thereof, and the like. In an embodiment, the inorganic solidification agent can include organic phosphonate compound and carbonate salt, such as an E-Form composition.

In some embodiments, the compositions of the present invention can include any agent or combination of agents that provide a requisite degree of solidification and aqueous solubility can be included in the present compositions. In other embodiments, increasing the concentration of the solidification agent in the present composition can tend to increase the hardness of the composition. In yet other embodiments, decreasing the concentration of solidification agent can tend to loosen or soften the concentrate composition.

In some embodiments, the solidification agent can include any organic or inorganic compound that imparts a solid character to and/or controls the soluble character of the present composition, for example, when placed in an aqueous environment. For example, a solidifying agent can provide controlled dispensing if it has greater aqueous solubility compared to other ingredients in the composition. Urea can be one such solidification agent. By way of further example, for systems that can benefit from less aqueous solubility or a slower rate of dissolution, an organic nonionic or amide hardening agent may be appropriate.

In some embodiments, the compositions of the present invention can include a solidification agent that provides for convenient processing or manufacture of the present composition. For example, the solidification agent can be selected to form a composition that can harden to a solid form under ambient temperatures of about 30 to about 50° C. after mixing ceases and the mixture is dispensed from the mixing system, within about 1 minute to about 3 hours, or about 2 minutes to about 2 hours, or about 5 minutes to about 1 hour.

In an exemplary aspect, a solid rinse aid may include an effective amount of a solidification agent or a hardening agent, as for example, urea which vary the solubility of the composition in an aqueous medium during use such that the rinse aid and/or other active ingredients may be dispensed from the solid composition over an extended period of time. The composition may include a hardening agent in an amount in the range of up to about 50 wt %. In other embodiments, the hardening agent may be present in amount from about 20 wt % to about 40 wt %, or in the range of about 5 to about 15 wt %.

The compositions of the present invention can include solidification agent at any effective amount. The amount of solidification agent included in the present composition can vary according to the type of composition, the ingredients of the composition, the intended use of the composition, the quantity of dispensing solution applied to the solid composition over time during use, the temperature of the dispensing solution, the hardness of the dispensing solution, the physical size of the solid composition, the concentration of the other ingredients, the concentration of the cleaning agent in the composition, and other like factors. Suitable amounts can include about 1 to about 99 wt-%, about 1.5 to about 85 wt-%, about 2 to about 80 wt-%, about 10 to about 45 wt-%, about 15% to about 40 wt-%, about 20% to about 30 wt-%, about 30% to about 70%, about 40% to about 60%, up to about 50 wt-%, about 40% to about 50%.

Additional Exemplary Embodiments

In some aspects, the sanitizing rinse compositions according to the invention may comprise, consist of and/or consist essentially of a quaternary ammonium compound in an amount from about 0.001 wt-% to about 75 wt-%, and an anionic surfactant in an amount from about 0.0001 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least one additional functional ingredient selected from the group consisting of: an acidulant in an amount from about 0.1 wt-% to about 50 wt-%, a stabilizing agent in an amount from about 0.01 wt-% to about 10 wt-%, a defoamer in an amount from about 0.01 wt-% to about 20 wt-%, a viscosity enhancer or thickener in an amount from about 0.1 wt-% to about 5 wt-%, an additional surfactant in an amount from about 0.01 wt-% to about 50 wt-%, a sequestrant in an amount from about 0.01 wt-% to about 50 wt-%, and a solidification agent in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least two additional functional ingredients selected from the group consisting of: an acidulant in an amount from about 0.1 wt-% to about 50 wt-%, a stabilizing agent in an amount from about 0.01 wt-% to about 10 wt-%, a defoamer in an amount from about 0.01 wt-% to about 20 wt-%, a viscosity enhancer or thickener in an amount from about 0.1 wt-% to about 5 wt-%, an additional surfactant in an amount from about 0.01 wt-% to about 50 wt-%, a sequestrant in an amount from about 0.01 wt-% to about 50 wt-%, and a solidification agent in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least three additional functional ingredients selected from the group consisting of: an acidulant in an amount from about 0.1 wt-% to about 50 wt-%, a stabilizing agent in an amount from about 0.01 wt-% to about 10 wt-%, a defoamer in an amount from about 0.01 wt-% to about 20 wt-%, a viscosity enhancer or thickener in an amount from about 0.1 wt-% to about 5 wt-%, an additional surfactant in an amount from about 0.01 wt-% to about 50 wt-%, a sequestrant in an amount from about 0.01 wt-% to about 50 wt-%, and a solidification agent in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least four additional functional ingredients selected from the group consisting of: an acidulant in an amount from about 0.1 wt-% to about 50 wt-%, a stabilizing agent in an amount from about 0.01 wt-% to about 10 wt-%, a defoamer in an amount from about 0.01 wt-% to about 20 wt-%, a viscosity enhancer or thickener in an amount from about 0.1 wt-% to about 5 wt-%, an additional surfactant in an amount from about 0.01 wt-% to about 50 wt-%, a sequestrant in an amount from about 0.01 wt-% to about 50 wt-%, and a solidification agent in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least five additional functional ingredients selected from the group consisting of: an acidulant in an amount from about 0.1 wt-% to about 50 wt-%, a stabilizing agent in an amount from about 0.01 wt-% to about 10 wt-%, a defoamer in an amount from about 0.01 wt-% to about 20 wt-%, a viscosity enhancer or thickener in an amount from about 0.1 wt-% to about 5 wt-%, an additional surfactant in an amount from about 0.01 wt-% to about 50 wt-%, a sequestrant in an amount from about 0.01 wt-% to about 50 wt-%, and a solidification agent in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least six additional functional ingredients selected from the group consisting of: an acidulant in an amount from about 0.1 wt-% to about 50 wt-%, a stabilizing agent in an amount from about 0.01 wt-% to about 10 wt-%, a defoamer in an amount from about 0.01 wt-% to about 20 wt-%, a viscosity enhancer or thickener in an amount from about 0.1 wt-% to about 5 wt-%, an additional surfactant in an amount from about 0.01 wt-% to about 50 wt-%, a sequestrant in an amount from about 0.01 wt-% to about 50 wt-%, and a solidification agent in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, an acidulant in an amount from about 0.1 wt-% to about 50 wt-%, a stabilizing agent in an amount from about 0.01 wt-% to about 10 wt-%, a defoamer in an amount from about 0.01 wt-% to about 20 wt-%, a viscosity enhancer or thickener in an amount from about 0.1 wt-% to about 5 wt-%, an additional surfactant in an amount from about 0.01 wt-% to about 50 wt-%, a sequestrant in an amount from about 0.01 wt-% to about 50 wt-%, and a solidification agent in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least one additional functional ingredient selected from the group consisting of: additional surfactants, thickeners and/or viscosity modifiers, solvents, solubility modifiers, humectants, metal protecting agents, stabilizing agents, corrosion inhibitors, sequestrants and/or chelating agents, solidifying agent, sheeting agents, pH modifying components, aesthetic enhancing agents, other cleaning agents, hydrotropes or couplers, buffers, and the like in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least two additional functional ingredients selected from the group consisting of: additional surfactants, thickeners and/or viscosity modifiers, solvents, solubility modifiers, humectants, metal protecting agents, stabilizing agents, corrosion inhibitors, sequestrants and/or chelating agents, solidifying agent, sheeting agents, pH modifying components, aesthetic enhancing agents, other cleaning agents, hydrotropes or couplers, buffers, and the like in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least three additional functional ingredients selected from the group consisting of: additional surfactants, thickeners and/or viscosity modifiers, solvents, solubility modifiers, humectants, metal protecting agents, stabilizing agents, corrosion inhibitors, sequestrants and/or chelating agents, solidifying agent, sheeting agents, pH modifying components, aesthetic enhancing agents, other cleaning agents, hydrotropes or couplers, buffers, and the like in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least four additional functional ingredients selected from the group consisting of: additional surfactants, thickeners and/or viscosity modifiers, solvents, solubility modifiers, humectants, metal protecting agents, stabilizing agents, corrosion inhibitors, sequestrants and/or chelating agents, solidifying agent, sheeting agents, pH modifying components, aesthetic enhancing agents, other cleaning agents, hydrotropes or couplers, buffers, and the like in an amount from about 0.01 wt-% to about 50 wt-%.

In some aspects, the sanitizing rinse compositions according to the invention may comprise, consist of and/or consist essentially of a quaternary ammonium compound in an amount from about 0.001 wt-% to about 75 wt-%, an anionic surfactant in an amount from about 0.0001 wt-% to about 50 wt-%, and at least five additional functional ingredients selected from the group consisting of: additional surfactants, thickeners and/or viscosity modifiers, solvents, solubility modifiers, humectants, metal protecting agents, stabilizing agents, corrosion inhibitors, sequestrants and/or chelating agents, solidifying agent, sheeting agents, pH modifying components, aesthetic enhancing agents, other cleaning agents, hydrotropes or couplers, buffers, and the like in an amount from about 0.01 wt-% to about 50 wt-%.

Use Compositions

The 2-in-1 sanitizing rinse compositions may include concentrate compositions or may be diluted to form use compositions. In general, a concentrate refers to a composition that is intended to be diluted with water to provide a use solution that contacts a surface and/or product in need of treatment to provide the desired rinsing, sanitizing or the like. The 2-in-1 sanitizing rinse compositions that contacts the surface and/or product in need of treatment can be referred to as a concentrate or a use composition (or use solution) dependent upon the formulation employed in methods according to the invention. It should be understood that the concentration of the quaternary ammonium compound and anionic surfactants in the composition will vary depending on whether the composition is provided as a concentrate or as a use solution.

A use solution may be prepared from the concentrate by diluting the concentrate with water at a dilution ratio that provides a use solution having desired sanitizing and/or other antimicrobial properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

In preferred embodiments the present invention includes concentrate compositions and use compositions. In an embodiment, a concentrate composition can be diluted to a use solution before applying to an object. The concentrate can be marketed and an end user can dilute the concentrate with water or an aqueous diluent to a use solution. The level of active components in the concentrate composition is dependent on the intended dilution factor and the desired activity of the antimicrobial composition. Generally, a dilution of about 1 fluid ounce to about 10 gallons of water to about 10 fluid ounces to about 1 gallon of water is used for aqueous compositions of the present invention. In some embodiments, higher use dilutions can be employed if elevated use temperature (greater than 25° C.) or extended exposure time (greater than 30 seconds) can be employed. In the typical use locus, the concentrate is diluted with a major proportion of water using commonly available tap or service water mixing the materials at a dilution ratio of about 3 to about 40 ounces of concentrate per 100 gallons of water.

In some embodiments, the concentrated compositions can be diluted at a dilution ratio of about 0.1 g/L to about 100 g/L concentrate to diluent, about 0.5 g/L to about 10.0 g/L concentrate to diluent, about 1.0 g/L to about 4.0 g/L concentrate to diluent, or about 1.0 g/L to about 2.0 g/L concentrate to diluent.

In other embodiments, a use composition can include about 0.01 to about 10 wt-% of a concentrate composition and about 90 to about 99.99 wt-% diluent; or about 0.1 to about 1 wt-% of a concentrate composition and about 99 to about 99.9 wt-% diluent.

Amounts of an ingredient in a use composition can be calculated from the amounts listed above for concentrate compositions and these dilution factors. In some embodiments, the concentrated compositions of the present invention are diluted such that the quaternary ammonium component is present at from about 10 ppm to about 100 ppm, or about 20 ppm to about 80 ppm. In other embodiments, the concentrated compositions of the present invention are diluted such that the quaternary ammonium component is present at about 20 ppm or more, about 40 ppm or more, about 60 ppm or more, about 80 ppm or more, about 100 ppm or more, about 500 ppm, about 1000 ppm, or about 10,000 to about 20,000 ppm. It is to be understood that all values and ranges between these values and ranges are encompassed by the present invention.

In an embodiment of the invention, the concentrated compositions and use compositions maintain their sanitizing efficacy while being tolerant to water conditions, or are independent of water conditions such as water hardness. According to embodiments of the invention, compositions are tolerant of water conditions of about 0 parts per million (ppm) to about 500 ppm (about 0 to about 30 grains per gallon) water hardness without impacting sanitizing efficacy according to embodiments of the invention. As referred to herein, the ppm of water hardness refers to ppm of calcium, magnesium and other metals which may be found in the water and contributing to the hardness level.

Manufacturing Methods

Compositions of the invention are prepared by simple addition of materials. The anionic surfactant is added to the quaternary ammonium. The quaternary ammonium compound readily couples the more hydrophobic organic acid into solution with minimal or no agitation.

In some aspects, the compositions according to the invention can be made by combining the components in an aqueous diluent using commonly available containers and blending apparatus. Beneficially, no special manufacturing equipment is required for making the compositions employing the quaternary ammonium compounds and the anionic surfactants. A preferred method for manufacturing the cleaning composition of the invention includes introducing the components into a stirred production vessel.

Methods of Use

The 2-in-1 sanitizing rinse compositions according to the invention beneficially provide synergistic efficacy by formulating compositions comprising quaternary ammonium compounds and anionic surfactants. Without being limited according to a particular mechanism of action according to the invention, the synergistic combination unexpectedly overcomes limitations of use of quaternary ammonium compounds as sanitizing agents, which are known to have difficulty retaining kill efficacy of gram negative microbes (e.g. $E.\ coli$) at concentrations below about 150 ppm actives, and moreover are less efficient at reduced temperatures. Moreover, the limitations of quaternary ammonium compounds as rinse aids are further overcome through the combination with anionic surfactants, including enhanced sheeting performance without resulting in spotting and/or filming. In a particular beneficial aspect, the 2-in-1 sanitizing rinse compositions according to the invention are suitable for use in low temperature applications, including auto-dish sanitizing rinse aids.

In an aspect, the present invention beneficially provides a reduced surface tension of the aqueous solutions, or use solution, according to the invention. In an aspect, the surface tension is reduced to less than about 35 dynes/cm, and preferably between about 35 and about 15 dynes/cm. In another aspect, the surface tension is reduced to less than about 35 dynes/cm, less than about 30 dynes/cm, less than about 25 dynes/cm, or less than about 20 dynes/cm.

In an aspect, the present invention beneficially provides a reduction in contact angle on the surface wetted with the compositions of the invention in comparison to contact angle of a conventional rinse aid composition comprising a nonionic surfactant instead of the quaternary ammonium compound and anionic surfactant of the present invention. In an aspect, the compositions of the invention are present in an amount effective to reduce the contact angle of the composition by at least 5 degrees, or preferably at least 10 degrees or most preferably the contact angle is reduced by at least 15 degrees in comparison to contact angle of a conventional rinse aid composition. In a further aspect, the compositions for sanitizing and rinsing surfaces provide a contact angle of less than about 40 degrees, from about 30 to about 40 degrees, less than about 30 degrees, less than about 20 degrees, or most preferably less than about 15 degrees.

In an aspect, the present invention includes use of the compositions for sanitizing and rinsing surfaces and/or products. In another aspect, the compositions of the invention are particularly suitable for use as a hard surface cleaner and/or sanitizer, food contact sanitizer (including direct or indirect contact sanitizer), tissue contact sanitizer (including for example fruits and vegetables), fast drying sanitizer for various hard surfaces (including for example healthcare surfaces, instruments, food and/or beverage surfaces, processing surfaces, and the like), any-streaking or smearing hard surface sanitizer, and the like. The present methods can be used in the methods, processes or procedures described and/or claimed in U.S. Pat. Nos. 5,200,189, 5,314,687, 5,718,910, 6,165,483, 6,238,685B1, 8,017,409 and 8,236,573, each of which are herein incorporated by reference in their entirety.

The methods of use are particularly suitable for warewashing. Suitable methods for using the sanitizing rinse aid compositions for warewashing are set forth in U.S. Pat. No. 5,578,134, which is herein incorporated by reference in its entirety. Beneficially, according to various embodiments of the invention, the methods provide the following unexpected benefits: improved sanitizing efficacy and/or rinsing; and use of low temperatures which further reduces utility costs and energy consumption.

Exemplary articles in the warewashing industry that can be treated with a sanitizing rinse aid composition according to the invention include plastics, dishware, cups, glasses, flatware, and cookware. For the purposes of this invention, the terms "dish" and "ware" are used in the broadest sense to refer to various types of articles used in the preparation, serving, consumption, and disposal of food stuffs including pots, pans, trays, pitchers, bowls, plates, saucers, cups, glasses, forks, knives, spoons, spatulas, and other glass, metal, ceramic, plastic composite articles commonly available in the institutional or household kitchen or dining room. In general, these types of articles can be referred to as food or beverage contacting articles because they have surfaces which are provided for contacting food and/or beverage. When used in these warewashing applications, the rinse aid should provide effective sheeting action and low foaming (or non-foaming) properties. In addition to having the desirable properties described above, it may also be useful for the sanitizing rinse aid composition to be biodegradable, environmentally friendly, and generally nontoxic. A rinse aid of this type may be described as being "food grade".

The methods of use are suitable for treating a variety of surfaces, products and/or target in addition to ware. For example, these may include a food item or a plant item and/or at least a portion of a medium, a container, an equipment, a system or a facility for growing, holding, processing, packaging, storing, transporting, preparing, cooking or serving the food item or the plant item. The present methods can be used for treating any suitable plant item. In some embodiments, the plant item is a grain, fruit, vegetable or flower plant item, a living plant item or a harvested plant item. In addition, the present methods can be used for treating any suitable food item, e.g., an animal product, an animal carcass or an egg, a fruit item, a vegetable item, or a grain item. In still other embodiments, the food item may include a fruit, grain and/or vegetable item.

In a still further embodiment, the methods of the invention are suitable for meeting various regulatory standards, including for example EPA food contact sanitizers requiring at least a 5 log reduction in pathogenic microorganisms in 30 seconds and/or NSF standards similarly requiring at least a 5 log reduction in treated pathogenic microorganisms. In still further aspects, without limiting the scope of the invention, the methods of the invention may provide sufficient sanitizing efficacy at conditions more or less strenuous than such regulatory standards.

The present methods can be used for treating a target that is at least a portion of a container, an equipment, a system or a facility for holding, processing, packaging, storing, transporting, preparing, cooking or serving the food item or the plant item. In some embodiments, the target is at least a portion of a container, an equipment, a system or a facility for holding, processing, packaging, storing, transporting, preparing, cooking or serving a meat item, a fruit item, a vegetable item, or a grain item. In other embodiments, the target is at least a portion of a container, an equipment, a system or a facility for holding, processing, packaging, storing, or transporting an animal carcass. In still other embodiments, the target is at least a portion of a container, an equipment, a system or a facility used in food processing, food service or health care industry. In yet other embodiments, the target is at least a portion of a fixed in-place process facility. An exemplary fixed in-place process facility can comprise a milk line dairy, a continuous brewing system, a pumpable food system or a beverage processing line.

The various methods of sanitizing rinsing according to the invention can include the use of any suitable level of the quaternary ammonium compound and anionic surfactant. In some embodiments, the treated target composition comprises from about 1 ppm to about 1000 ppm of the quaternary ammonium compound when diluted for use. In further embodiments, the treated target composition comprises from about 1 ppm and about 100 ppm, 5 ppm and about 100 ppm, 10 ppm and about 100 ppm, 20 ppm and about 100 ppm, 25 ppm and about 100 ppm, 10 ppm and about 75 ppm, 20 ppm and about 75 ppm, 25 ppm and about 75 ppm, or about 50 ppm of the quaternary ammonium compound when diluted for use. In some embodiments, the treated target composition comprises from about 1 ppm to about 1000 ppm of the anionic surfactant in a use solution. In further embodiments, the treated target composition comprises from about 1 ppm and about 500 ppm, 5 ppm and about 250 ppm, 10 ppm and about 100 ppm, 20 ppm and about 100 ppm, 25 ppm and about 100 ppm, 10 ppm and about 50 ppm, 20 ppm and about 50 ppm, 25 ppm and about 50 ppm, or about 50 ppm and about 100 ppm of the anionic surfactant when diluted for use.

The various applications of use described herein provide the quaternary ammonium compound and anionic surfactant compositions to a surface and/or product in need of sanitizing and rinsing. Beneficially, the compositions of the invention are fast-acting. However, the present methods require a certain minimal contact time of the compositions with the surface or product in need of treatment for occurrence of sufficient antimicrobial effect. The contact time can vary with concentration of the use compositions, method of applying the use compositions, temperature of the use compositions, pH of the use compositions, amount of the surface or product to be treated, amount of soil or substrates on/in the surface or product to be treated, or the like. The contact or exposure time can be about 15 seconds, at least about 15 seconds, about 30 seconds or greater than 30 seconds. In some embodiments, the exposure time is about 1 to 5 minutes. In other embodiments, the exposure time is a few minutes to hours. In other embodiments, the exposure time is a few hours to days. The contact time will further vary based upon the use concentration of actives of compositions according to the invention.

The present methods can be conducted at any suitable temperature. In some embodiments, the present methods are conducted at a temperature ranging from about 0° C. to about 5° C., e.g., from about 5° C. to about 10° C., 0° C. to about 10° C., 0° C. to about 20° C., 0° C. to about 40° C., 0° C. to about 50° C., 0° C. to about 80° C., or at increased temperatures there above suitable for a particular application of use. Beneficially, the sanitizing rinse aid compositions provide sanitizing efficacy at low temperature ranges, including those at room temperature. Accordingly, the compositions and methods are preferred for use in a rinse application using lower temperatures, such as about 50° C. or less, preferably 48° C. or less (120° F.) which is often referred to as a chemical sanitizing rinse cycle, as the water temperature alone would be unable to provide a sanitizing result. Alternatively, this invention can used as traditional rinse aid at above 70° C. where chemical sanitization is not required.

Beneficially, the 2-in-1 sanitizing rinse compositions are suitable for antimicrobial efficacy against a broad spectrum of microorganisms, providing broad spectrum bactericidal and fungistatic activity. For example, the of this invention provide broad spectrum activity against wide range of different types of microorganisms (including both aerobic and anaerobic microorganisms, gram positive and gram negative microorganisms), including bacteria, yeasts, molds, fungi, algae, and other problematic microorganisms.

The present methods can be used to achieve any suitable reduction of the microbial population in and/or on the target or the treated target composition. In some embodiments, the present methods can be used to reduce the microbial population in and/or on the target or the treated target composition by at least one log 10. In other embodiments, the present methods can be used to reduce the microbial population in and/or on the target or the treated target composition by at least two log 10. In still other embodiments, the present methods can be used to reduce the microbial population in and/or on the target or the treated target composition by at least three log 10. In still other embodiments, the present methods can be used to reduce the microbial population in and/or on the target or the treated target composition by at least five log 10. Without limiting the scope of invention, the numeric ranges are inclusive of the numbers defining the range and include each integer within the defined range.

In an aspect, the methods of the invention include generating a use solution from the concentrated solid or liquid compositions of the invention. A use solution may be prepared from the concentrate by diluting the concentrate with water at a dilution ratio that provides a use solution having desired sanitizing and/or other antimicrobial properties. The water that is used to dilute the concentrate to form the use composition can be referred to as water of dilution or a diluent, and can vary from one location to another. The typical dilution factor is between approximately 1 and approximately 10,000. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

In an aspect, a concentrated 2-in-1 sanitizing rinse composition is diluted to use solution concentration of about 0.001% (wt/vol.) to about 10% (wt/vol.), or from about 0.001% (wt/vol.) to about 5% (wt/vol.), or from about 0.001% (wt/vol.) to about 2% (wt/vol.), or from about 0.01% (wt/vol.) to about 1% (wt/vol.). Without being limited to a particular dilution of the concentrated 2-in-1 sanitizing rinse composition, in some aspects this dilution corresponds to approximately 0.1 mL to about 10 mL of the liquid concentrate per dish machine cycle (as one skilled in the art understands to further dependent on the rinse water volume of the dish machine). Without limiting the scope of invention, the numeric ranges are inclusive of the numbers defining the range and include each integer within the defined range.

Compositions of the invention can be formulated and sold for use as is, or as solvent or solid concentrates. If desired, such concentrates can be used full-strength as sanitizing rinse compositions. However, the concentrates typically will be diluted with a fluid (e.g., water) that subsequently forms the dilute phase or a use solution. Preferably, the concentrate forms a single phase before such dilution and remains so while stored in the container in which it will be sold. When combined with water or other desired diluting fluid at an appropriate dilution level and subjected to mild agitation (e.g., by stirring or pumping the composition), some compositions of the invention will form a pseudo-stable dispersion, and other compositions of the invention will form a clear or quasi-stable solution or dispersion. If a pseudo-stable composition is formed, then the composition preferably remains in the pseudo-stable state for a sufficiently long period so that the composition can be applied to a surface before the onset of phase separation. The pseudo-stable state need only last for a few seconds when suitably rapid application techniques such as spraying are employed, or when agitation during application is employed. The pseudo-stable state desirably lasts for at least one minute or more after mixing and while the composition is stored in a suitable vessel, and preferably lasts for five minutes or more after mixing. Often normal refilling or replenishment of the applicator (e.g., by dipping the applicator in the composition) will provide sufficient agitation to preserve the pseudo-stable state of the composition during application.

The compositions can be dosed into an application of use, or dispensed as the concentrate or use solution, during a rinse application, such as a rinse cycle, for example, in a warewashing machine, a car wash application, or the like. In some embodiments, formation of a use solution can occur from a 2-in-1 sanitizing rinse composition installed in a cleaning machine, for example onto a dish rack. The 2-in-1 sanitizing rinse composition can be diluted and dispensed from a dispenser mounted on or in the machine or from a separate dispenser that is mounted separately but cooperatively with the dish machine. For example, in some embodiments, liquid rinse agents can be dispensed by incorporating compatible packaging containing the liquid material into a dispenser adapted to diluting the liquid with water to a final use concentration. Some examples of dispensers for the liquid rinse agent of the invention are DRYMASTER-P sold by Ecolab Inc., St. Paul, Minn.

Figure 9:
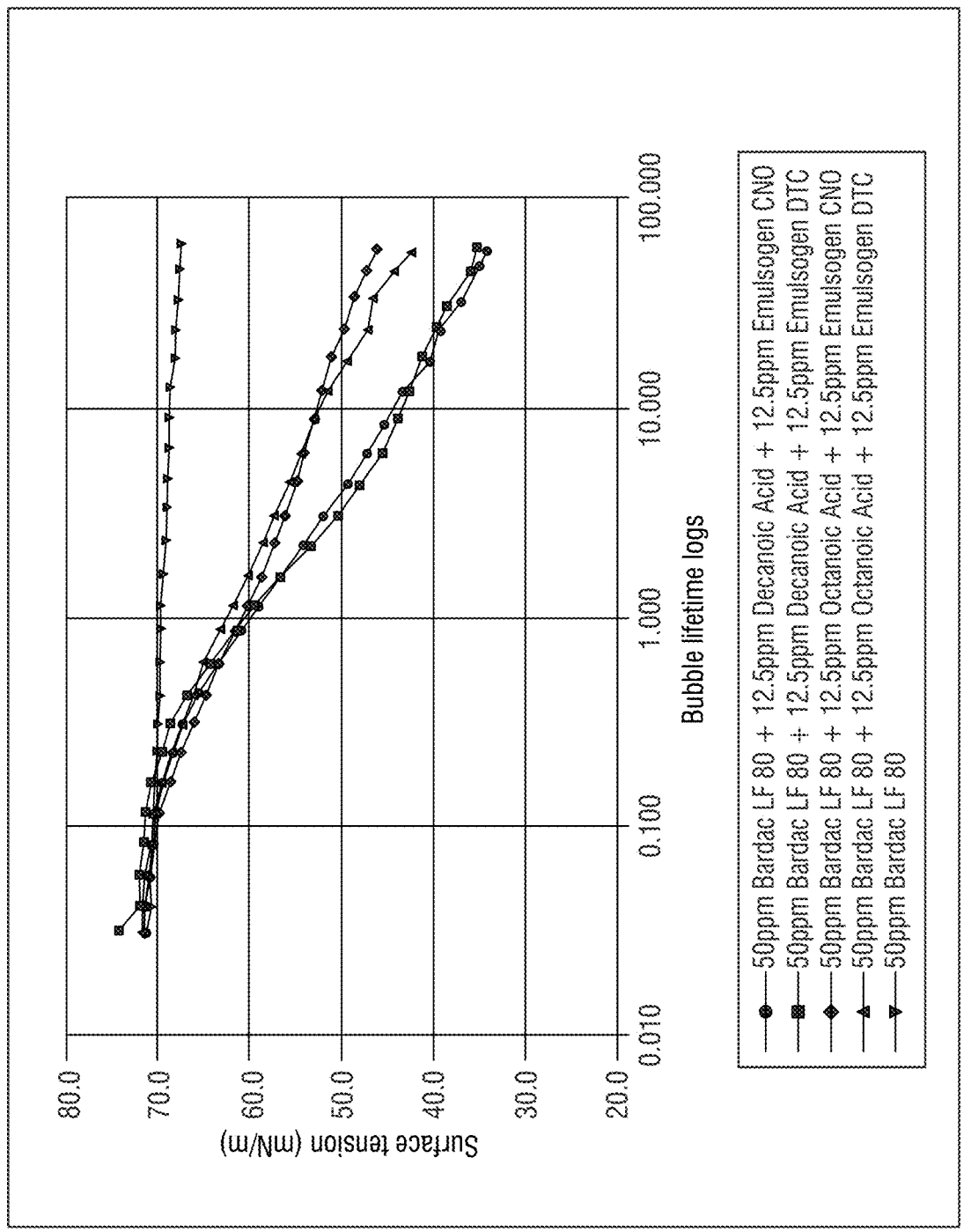
FIGS. 9-14 are graphical representations of the average dynamic surface tension of experimental and comparative solutions as described in Example 6 according to embodiments of the invention.
Figure 10:
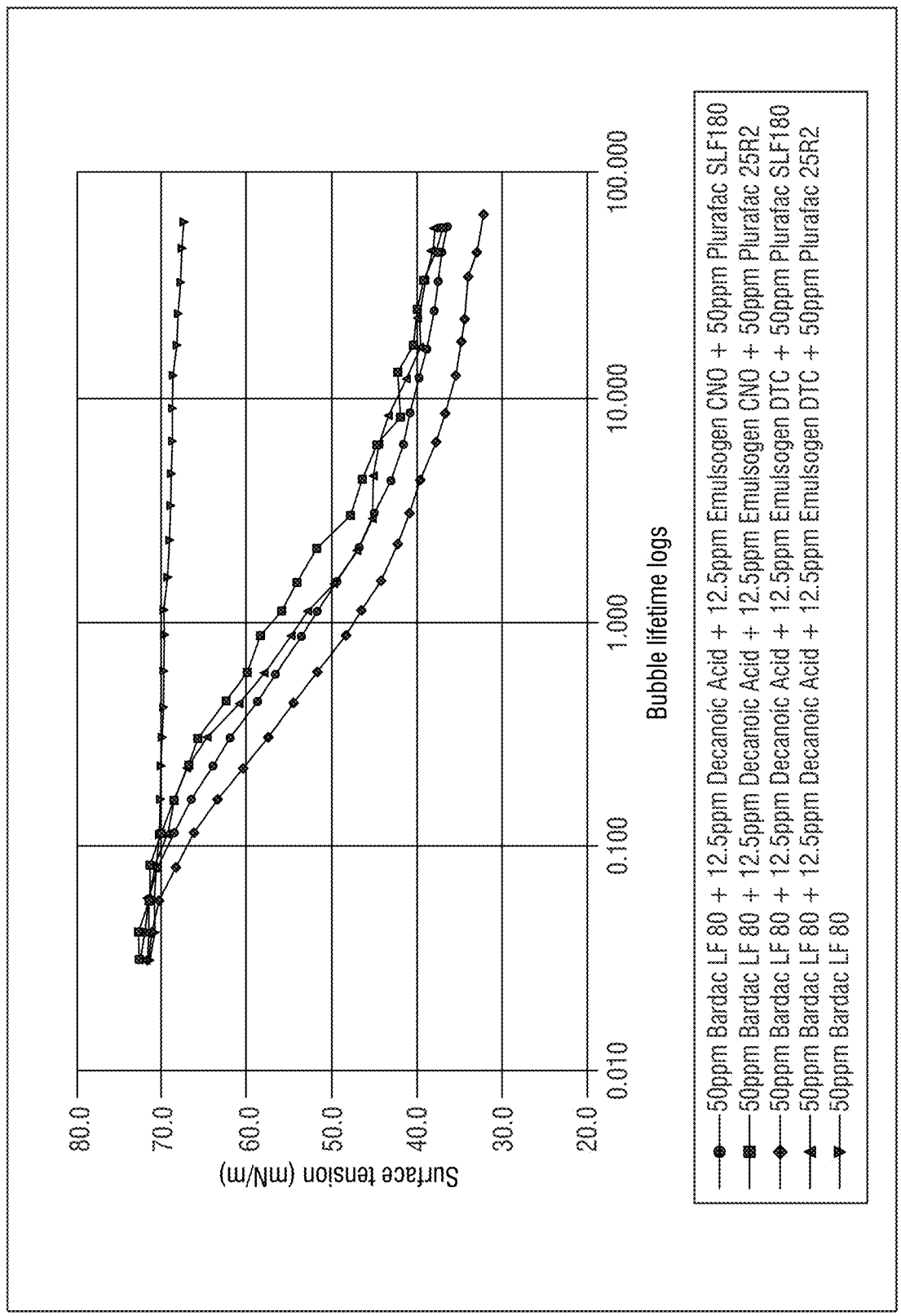
Figure 11:
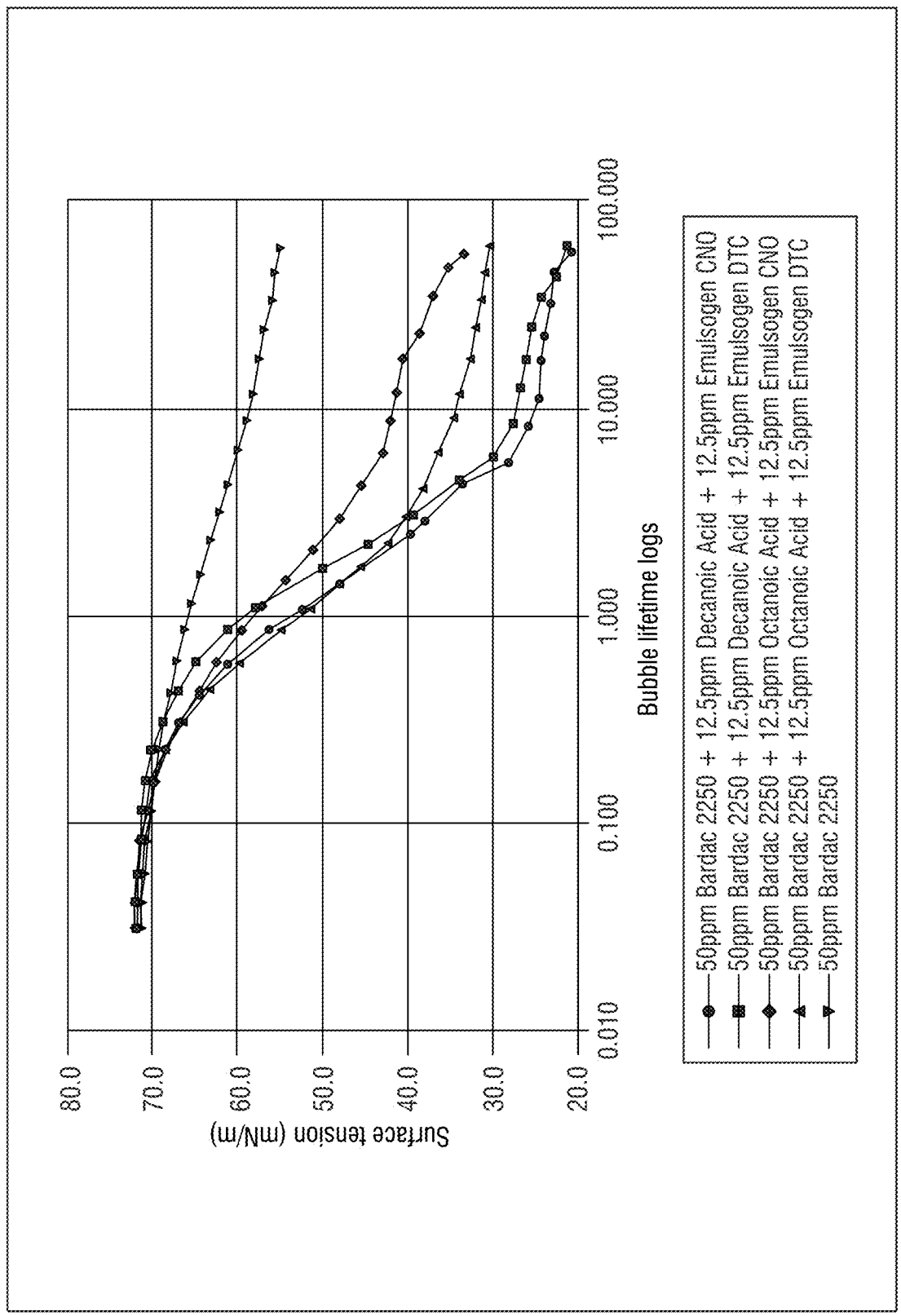
Figure 12:
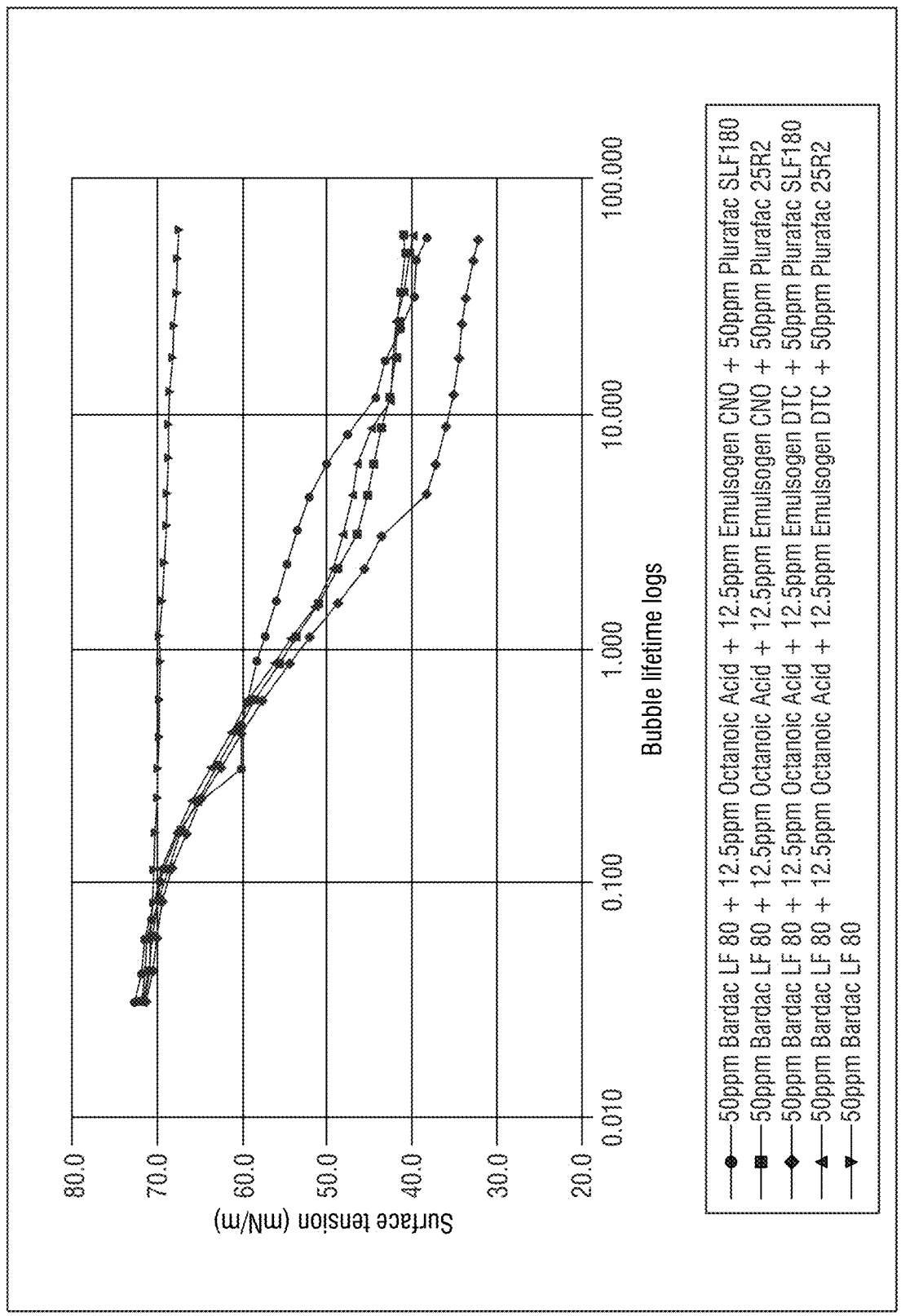
Figure 13:
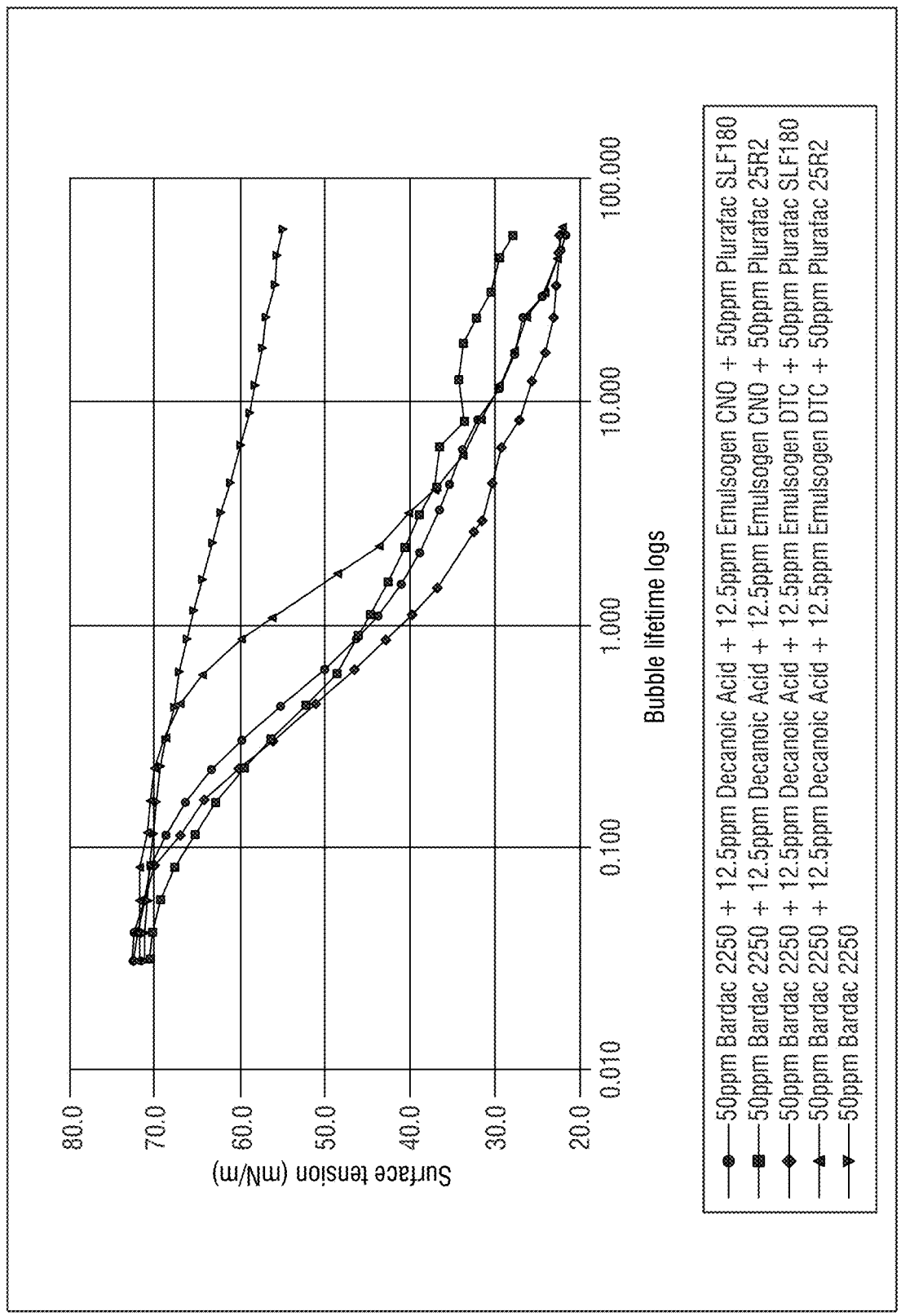
Figure 14:
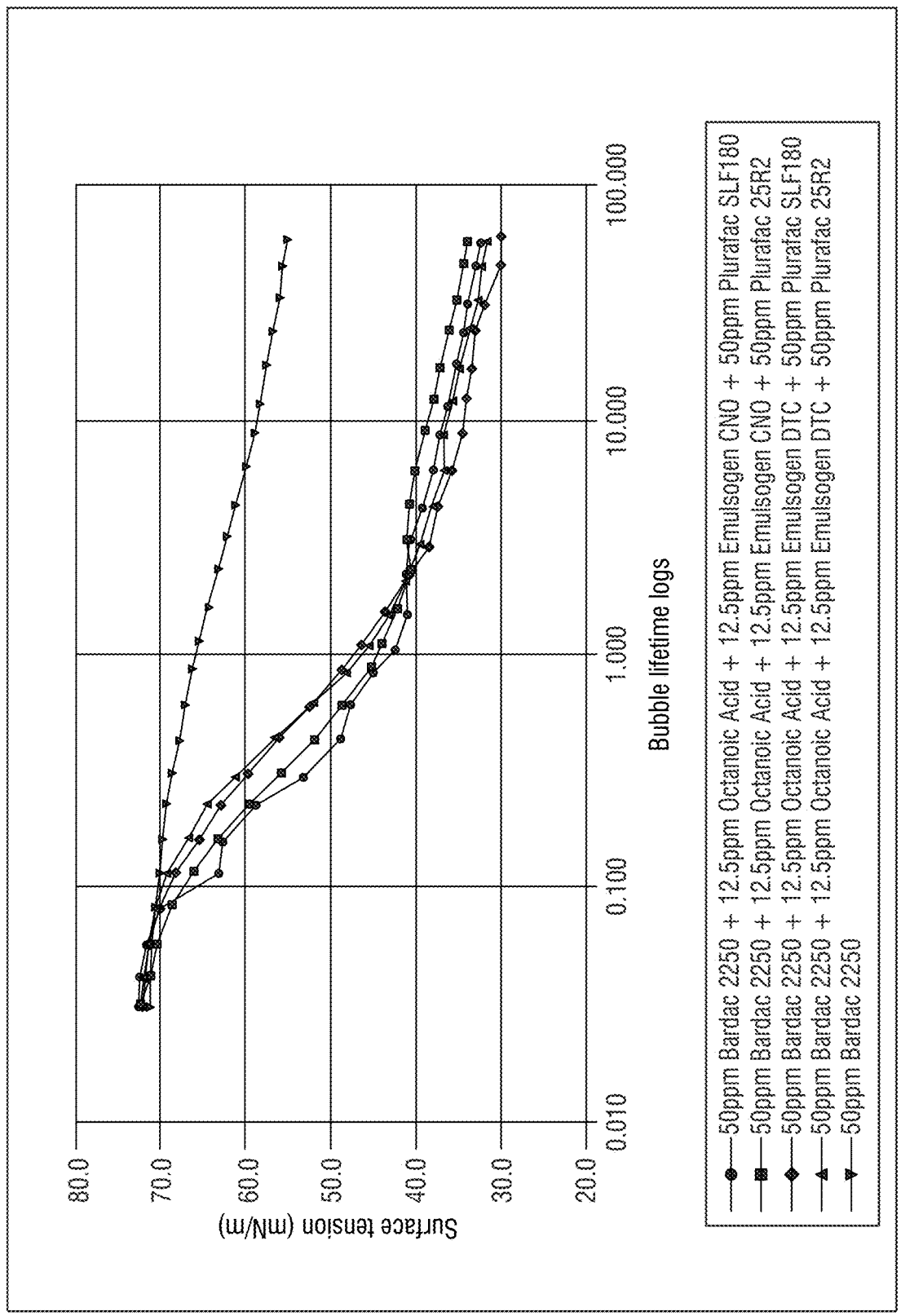

In other example embodiments, solid products may be conveniently dispensed by inserting a solid material in a container or with no enclosure into a spray-type dispenser such as the volume SOL-ET controlled ECOTEMP Rinse Injection Cylinder system manufactured by Ecolab Inc., St. Paul, Minn. Such a dispenser cooperates with a warewashing machine in the rinse cycle. When demanded by the machine, the dispenser directs a spray of water onto the cast solid block of rinse agent which effectively dissolves a portion of the block creating a concentrated aqueous rinse solution which is then fed directly into the rinse water forming the aqueous rinse. The aqueous rinse is then contacted with the dishes to affect a complete rinse. This dispenser and other similar dispensers are capable of controlling the effective concentration of the active portion in the aqueous rinse by measuring the volume of material dispensed, the actual concentration of the material in the rinse water (an electrolyte measured with an electrode) or by measuring the time of the spray on the cast block. In general, the concentration of active portion in the aqueous rinse is preferably the same as identified above for liquid rinse agents. Some other embodiments of spray-type dispenser are disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. An example of a particular product shape is shown in FIG. 9 of U.S. Pat. No. 6,258,765, which is incorporated herein by reference.

Additional Applications of Use

The sanitizing rinse composition comprising the quaternary ammonium compounds and the anionic surfactant compositions providing synergistic antimicrobial efficacy are further suitable for use in rinsing and wetting applications (including non-sanitizing applications), formation of ionic liquids, other antimicrobial and hard surface cleaning applications, formation of antimicrobial emulsions and microemulsion formations, dissolution and de-odorization of fatty acids, including carboxylates, such as disclosed as suitable anionics according to embodiments of the invention, and other enhanced antimicrobial applications (e.g. sanitizers, disinfectants, high level disinfectant for medical instruments, etc.)

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Dynamic Surface Tension of Quat Compositions

The SITA science line t60 measures the dynamic surface tension of liquids up to the semi-static range. Air bubbles are generated from a capillary with known radius. The bubble pressure is measured as a function of bubble life time, which can be correlated to the surface tension according to the Young-Laplace equation. Dynamic surface tension provides insight in to the dynamic behavior of surfactants and other surface active compounds under dynamic conditions, i.e. how quick surfactants can reach a surface. The dynamic surface tension behavior of surfactants is particularly important in applications where a quick response of surfactant is required, for example, in short rinse cycles of automated dishwashing.

Apparatus and Materials

1. SITA T60 (Sita Messtechnik, Germany)
2. Oil bath with stir bar
3. Heating and stirring plate
4. Glass beakers
5. Glass vials (20 mL)

The SITA science line t60 was calibrated with DI water. Clean water samples after calibration should have a surface tension of 72.0±1.0 mN/m (depending on the quality and temperature). Following calibration, the SITA was programmed to take readings at the desired time intervals (i.e., 0.3, 1.6, 3.0, 9.1 seconds). Five separate solutions of antimicrobial quats at a concentration of 100 ppm were prepared to be tested as shown in Table 2.

TABLE 2

| Raw Material | Chemical Structure |
|---|---|
| Uniquat QAC-50 | Alkyl Benzyl ammonium chloride |
| Bardac 205M | Blend: Dialkyl/Alkyl Benzyl ammonium chloride |
| Bardac 2250 | Didecyl (C10) dimethyl ammonium chloride |
| Bardac 2050 | Blend: Didecyl/dioctyl dimethyl ammonium chloride |
| Bardac LF80 | Dioctyl (C8) dimethyl ammonium chloride |

10-15 mL were transferred into 20 mL vials and immersed in a water bath to 25° C.±2° C. The samples were equilibrated for 10-15 minutes. The samples were individually tested. After each sample was tested the SITA's cleaning procedure was run, then the surface tension of DI water was checked to ensure the SITA was adequately clean. If the DI water measurements were not within 72.0±1.0 mN/m, then the cleaning procedure was run again. The surface tension (mN/m) versus bubble life time at 75° F. was recorded and the experimental data is provided in FIG. 1 and Table 3 below. In part, Table 3 summarizes the dynamic surface activity rankings on a scale of 1-5, 1 being the most surface active (i.e., the lowest dynamic surface tension at the respective concentration and bubble lifetime) and 5 being the least surface active (i.e., the highest dynamic surface tension at the respective concentration and bubble lifetime). These results are demonstrated in FIG. 1.

The data from these experiments demonstrate variable dynamic surface tension between the five quats tested. For example, the surface tension of Bardac 2250 decreases steadily over the duration of the bubble life time, indicating that it is the most surface active compared to the four other quat solutions tested. In contrast, the surface tension of Bardac LF80 showed little decrease during the bubble life time, indicating it is the least surface active of the quat solutions tested. Surprisingly, even though Bardac 2250 and Bardac LF80 only differ slightly in structure, the former is the most surface active, while the latter is the least surface active. This suggests the hydrophobic factor is very important in the packing of these quat molecules in the interfaces.

Example 2

Foaming Evaluation of Quat Compositions

A test was run to determine the foam profiles of the five quat solutions of Example 1. A Glewwe foam apparatus in combination with the following procedure was used for this test. First, each quat was prepared and gently poured into a Glewwe cylinder. Samples tested contained a concentration of 50 ppm of the indicated antimicrobial quats. A ruler was attached to the side of the cylinder, and the solution was level with the bottom of the ruler. The pump was turned on. Foam height was estimated by reading the average level of foaming according to the ruler. Foam height readings were taken versus time with a stopwatch or timer. The pump was turned off and height of the foam was recorded at various times. Each sample was tested at 75° F., at a pressure of 6.0 psi. The foam level was read after 15 seconds of agitation and again after 60 seconds of agitation for a given amount of time. A stable foam is defined when the foam remains for several minutes after agitation is stopped. A partially stable foam breaks slowly within a minute. An unstable foam breaks rapidly in less than 15 seconds. A desirable rinse should have unstable foam to no foam. In contrast, antimicrobial hand soap should have stable foam.

Figure 2:
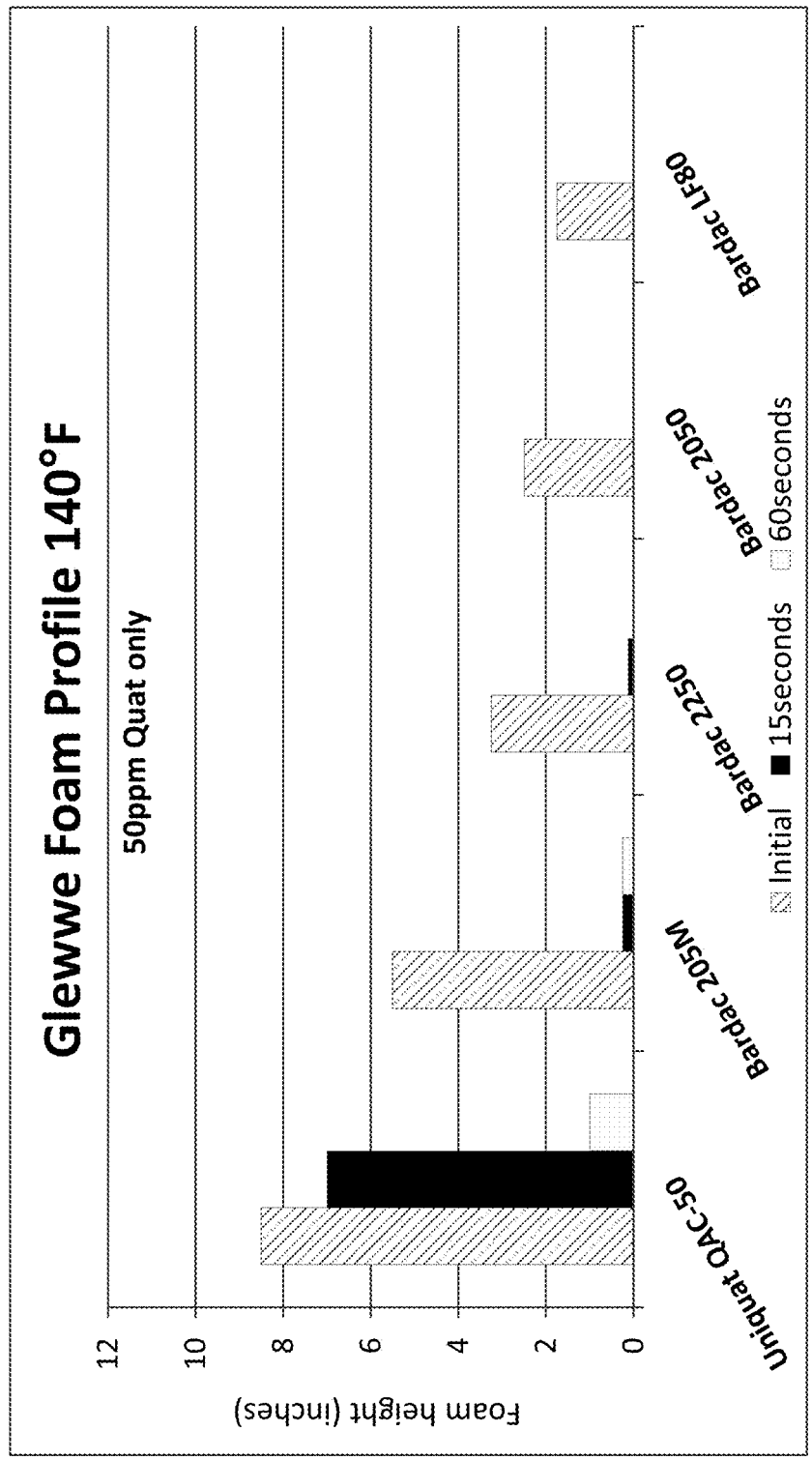
FIG. 2 shows a graphical depiction of the average foam height of five quanternary ammonium compositions as described in Example 2 employed to evaluate compositions suitable for low temperature and low foaming applications according to embodiments of the invention, such as sanitizing rinse aids.

The results from the foaming test are shown in FIG. 2, and described in Table 3 below. In part, Table 3 summarizes the foam properties of each solution by ranking them on a scale from 1-5, where a ranking of 1 indicates the highest foam, and a ranking of 5 indicates the lowest foam, measured in the Glewwe at 6 psi and 140° F. The data shows the particular benefit for selection of a quat solution useful for a particular application based at least in part on the foaming profile. For example, as can be seen in FIG. 2 and Table 3, Bardac LF80 is particularly suitable for an application such as rinse aid or sanitizing rinse, as low foam requirement is paramount.

TABLE 3

| | Glewwe Foam Test - 6psi - (140° F.) | 50 ppm Quat | |
|---|---|---|---|
| Raw Material | Chemical Structure | Dynamic Surface Activity | Foaming Profile |
| Uniquat QAC-50 | Alkyl Benzyl ammonium chloride | 3 | 1 |
| Bardac 205M | Blend: Dialkyl/Alkyl Benzyl ammonium chloride | 3 | 2 |
| Bardac 2250 | Didecyl (C10) dimethyl ammonium chloride | 1 | 3 |
| Bardac 2050 | Blend: Didecyl/dioctyl dimethyl ammonium chloride | 2 | 4 |
| Bardac LF80 | Dioctyl (C8) dimethyl ammonium chloride | 5 | 5 |

As shown in Table 3, the values for the foaming profile show 1 for the most foam and also 1 for the most surface activity, as well as a 5 for the lowest amount of foam and also 5 for the least surface active "surfactants." These results show that the Bardac LF80 is a preferred quat as it provides the lowest foam profile; however as it also has the very low surface activity it will need to be combined with an anionic surfactant to provide the required surface activity.

The results of this Example show that the foam characteristics of the quats alone (without a further surfactant) are insufficient for applications of use according to the invention and require a selected chain length of anionic surfactant.

Example 3

Dynamic Surface Tension of Quat-Anionic Surfactant Compositions

Figure 3:
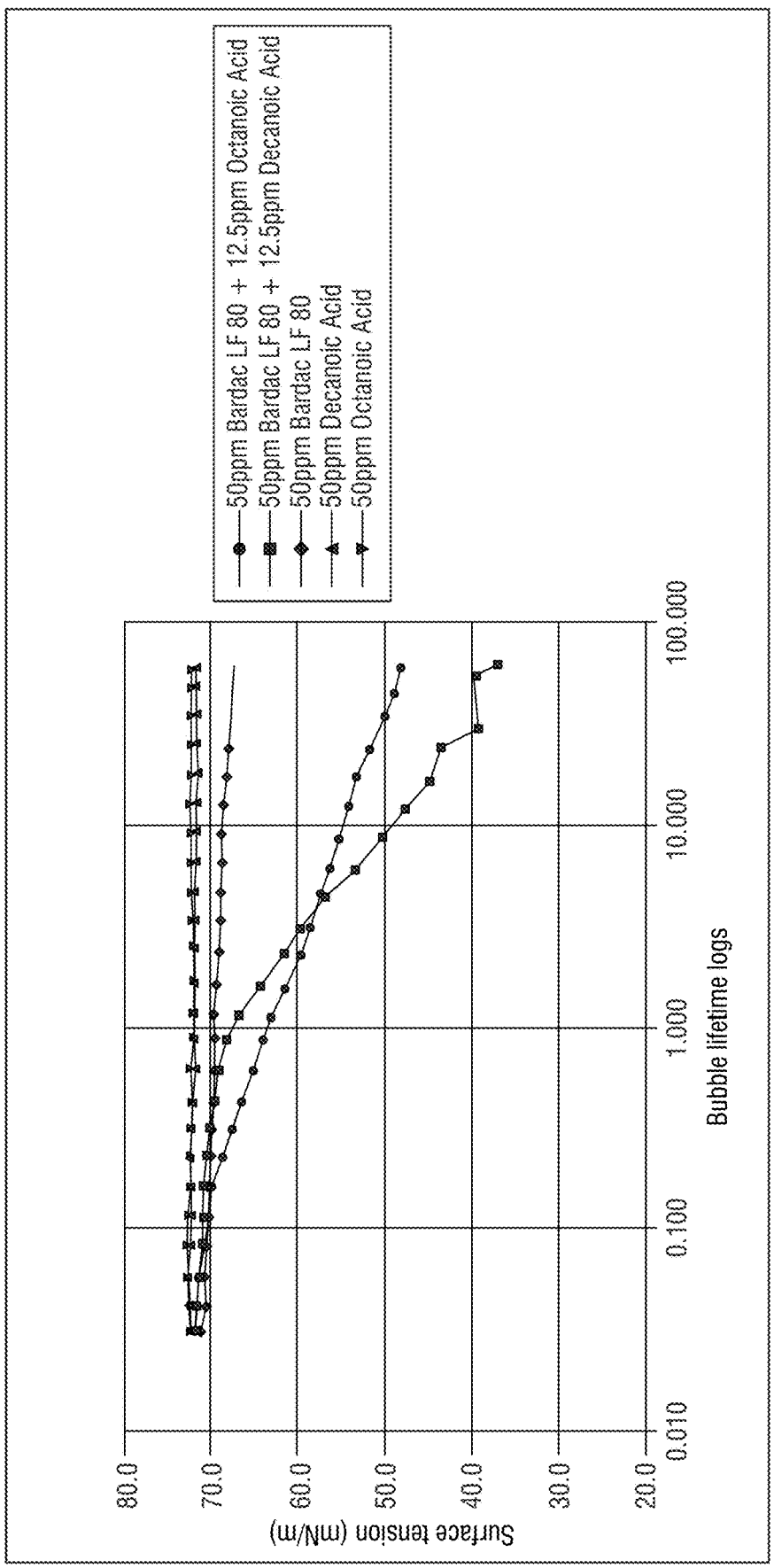
FIGS. 3-4 show graphical depictions of the average dynamic surface tension of quaternary ammonium and/or anionic surfactant solutions as described in Example 3 according to embodiments of the invention.

In furtherance to the results of Example 2, wherein the foam characteristics of the quats alone were insufficient for applications of use according to the invention, the combination with selected chain length of anionic surfactants were evaluated. Tests were run to determine the effects on the dynamic surface tension of Quat-Anionic surfactant pairs using the SITA science line t60 system. According to the procedure outlined in Example 1, five solutions were analyzed; 50 ppm Bardac LF80+12.5 ppm Octanoic acid; 50 ppm Bardac LF80+12.5 ppm Decanoic acid; 50 ppm Bardac LF80 alone; 50 ppm Octanoic acid alone; and 50 ppm Decanoic acid alone. As can be seen in FIG. 3, the solution of Bardac LF80 alone shows very little surface activity, consistent with the results from Example 1. Furthermore, the solution of Octanoic acid alone and the Decanoic acid solution display similar surface activity compared to Bardac LF80. Interestingly, when Bardac LF80 is combined with Octanoic acid or Decanoic acid the compositions display a significant decrease in surface tension over the course of the bubble lifetime. These data show a synergistic interaction between the Quat and Anionic surfactant resulting in enhanced surface activity that is not seen with the Quat or Anionic surfactant alone. While, both Anionic surfactants tested were capable of decreasing the dynamic surface tension when paired with an antimicrobial Quat, these data suggest that Decanoic acid is particularly effective.

Figure 4:
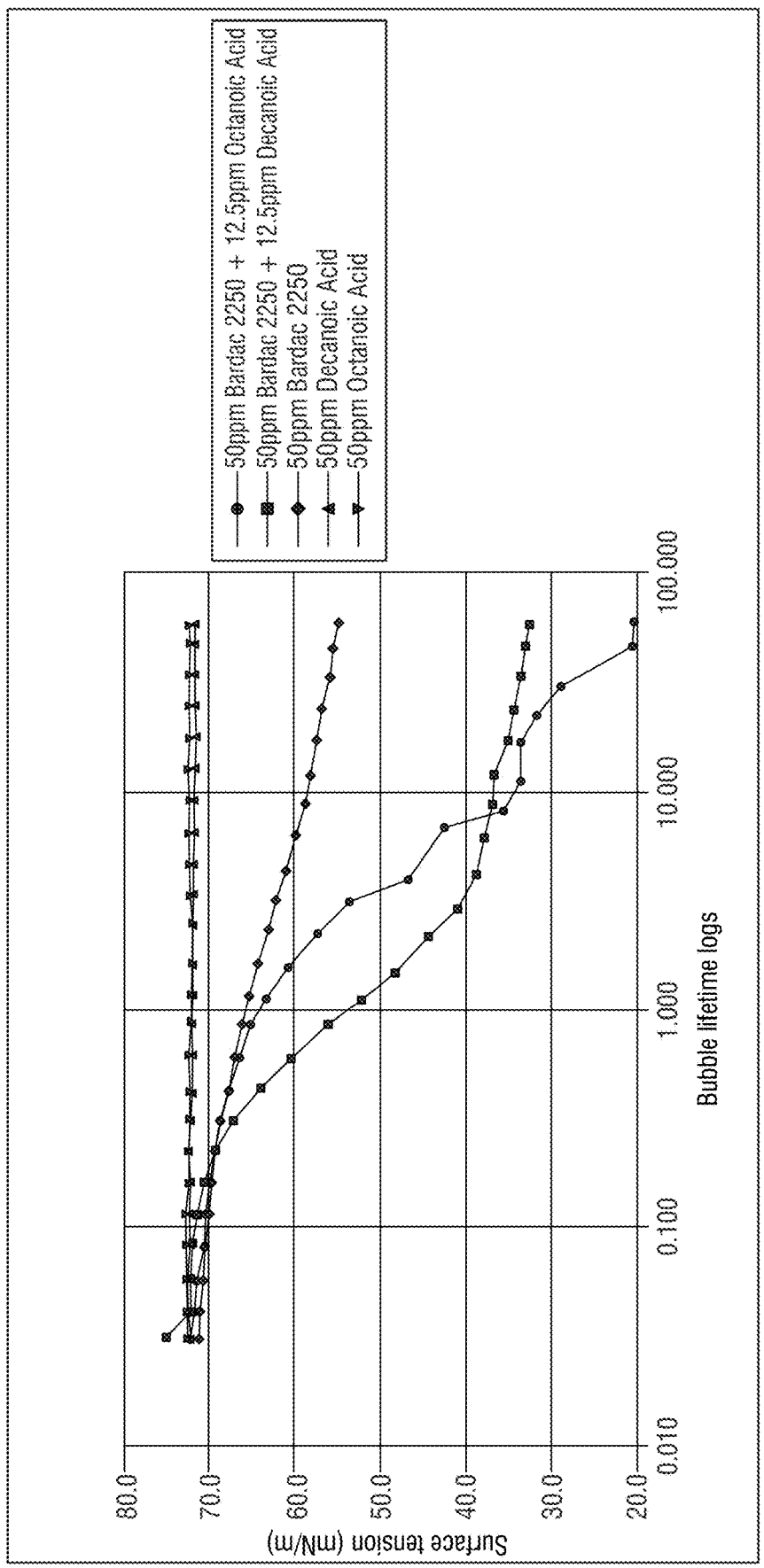

Further testing of Quat-Anionic surfactant pairs confirmed the results above. According to the procedure outlined in Example 1, the surface activity of the following five solutions were assessed; 50 ppm Bardac 2250+12.5 ppm Octanoic acid; 50 ppm Bardac 2250+12.5 ppm Decanoic acid; 50 ppm Bardac 2250 alone; 50 ppm Octanoic acid alone; and 50 ppm Decanoic acid alone. These results are demonstrated in FIGS. 3-4. Bardac 2250 displayed middle-of-the-road surface tension compared to the other 4 Quat compositions tested in Example 1. Consistent with the above results for Bardac LF80, a synergistic interaction was identified in the Bardac 2250+anionic surfactant pairs, which decreased the surface tension beyond the Quat or Anionic surfactant compositions alone and the Decanoic acid combination appears to be particularly effective (as the decanoic acid in combination with quat resulted in the lowest surface tension of the carboxylic acids tested).

Example 4

Contact Angle and Sheeting of Quat-Anionic Surfactant Compositions

Figure 5:
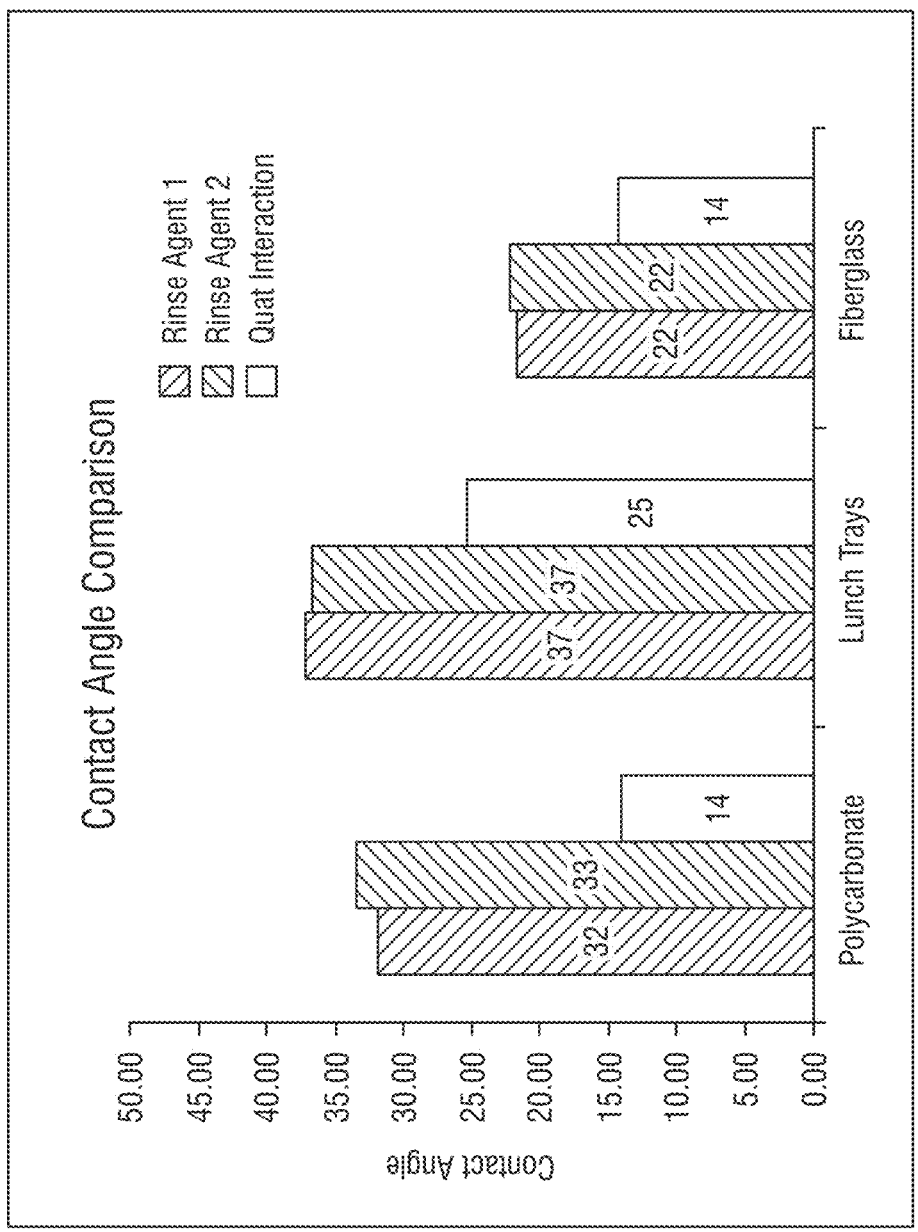
FIG. 5 shows is a graphical depiction of the average contact angles of comparative and experimental solutions as described in Example 4 according to embodiments of the invention.

An initial testing for observations of wetting were conducted by the following test used to dip coupons. A test was run to measure the angle at which a drop of solution contacts a test substrate, i.e., the contact angle. For this test, two comparative rinse agent compositions, Commercial rinse agent 1 and Commercial rinse agent 2, were prepared along with an exemplary rinse aid formulation according to the present invention (quat+anionic surfactant). Contact angle measurements were run at equal active surfactant 235 pm for inline rinse agent 1, inline rinse agent 2, and quat/anionic (Bardac 2250+Decanoic acid), respectfully. After each composition was prepared, the compositions were placed into an apparatus where a single drop of the composition was delivered to a test substrate. Test substrates used in this test included a polycarbonate coupon, a lunch tray, and a fiber glass tray. The deliverance of the drop to the substrate was recorded by a camera. The video captured by the camera was sent to a computer were the contact angle was to be determined. Without wishing to be bound by any particular theory, it is thought that the lower the contact angle the better the solution will induce sheeting. Increased sheeting is thought to lead to the dishware drying more quickly and with fewer spots once it has been removed from the dish machine. The results from this test are shown in FIG. 5.

The data from these tests show, the exemplary composition according to the present invention, resulted in significantly lower contact angles on all the substrates tested compared to the commercial formulations evaluated as controls (Commercial rinse agents 1 and 2). This was especially seen on the polycarbonate substrate, which is a conventionally difficult surface to obtain wettability and provide adequate rinsing capabilities. The contact angle of Quat-Anionic surfactant on the polycarbonate coupon was less than 50% of that of the comparative compositions, demonstrating unexpected benefits according to the invention.

For the sheeting test, a comparative composition (Commercial Product A—nonionic surfactant base) was tested alongside an exemplary composition of the present invention (235 ppm Bardac 2250 quat+Decanoic acid). Table 4 below shows the results of these tests.

TABLE 4

(Sheeting Observations)

| | 235 ppm Actives | |
|---|---|---|
| Substrates | Commercial Product A | Quat-DA |
| Glass | Complete | Complete |
| SS316 | Complete | Complete |
| PolyCarbonate | Partial | Complete |
| PET | Partial | Complete |

As can be seen from these results, the exemplary composition of the present invention, resulted in complete sheeting on every article tested. Whereas, the comparative composition failed to result in complete sheeting on every surface tested. These data are consistent with the contact angle results and indicate that Quat-Decanoic acid is particularly suitable to sheet a variety surfaces. The exemplary composition according to the present invention, resulted in significantly lower contact angles on all the substrates tested compared to commercial rinse aids. This was especially seen on the polycarbonate substrate. The contact angle of Quat-Anionic surfactant on the polycarbonate coupon was less than 50% of that of the comparative compositions.

Example 5

Foaming Evaluation of Quat-Anionic Surfactant Compositions

Figure 6:
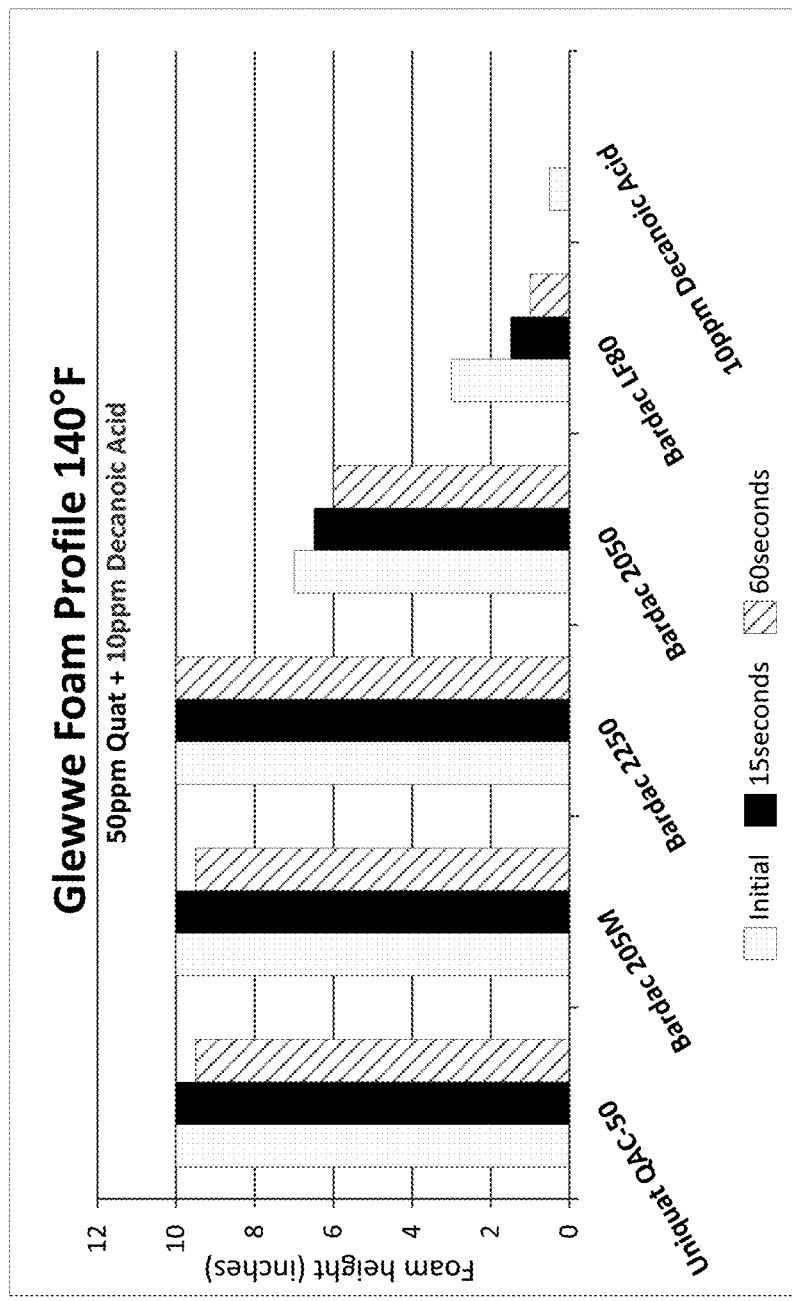
FIG. 6 shows a graphical depiction of the average foam height of quaternary ammonium and/or anionic surfactant solutions as described in Example 5 according to embodiments of the invention.

Another foam evaluation test was run using the procedure described in Example 2. For this test however, the foam profile of five Quat-Anionic surfactant compositions were analyzed; 50 ppm Uniquat QAC-50+10 ppm Decanoic acid; 50 ppm Bardac 205M+10 ppm Decanoic acid; 50 ppm Bardac 2250+10 ppm Decanoic acid; 50 ppm Bardac 2050+10 ppm Decanoic acid, 50 ppm Bardac LF80+10 ppm Decanoic acid; and 10 ppm Decanoic acid alone. FIG. 6 shows the results of this test.

As can be seen from this data, the Quat-Decanoic acid combinations result in synergy with the components, when compared to the results of FIG. 2. and Decanoic acid alone. The foam height and stability of all five Quat compositions were increased when combined with Decanoic acid. While, the Bardac LF80+Decanoic acid combination maintained the lowest foam properties of the Quats tested. For particular applications such as a rinse aid, where low foam is desirable, the inclusion of additional additives which reduce the foam are preferred. Generally, a desirable rinse aid or sanitizing rinse will have low foam height and breaks to nothing soon after agitation is stopped, and no foam is best.

Figure 7:
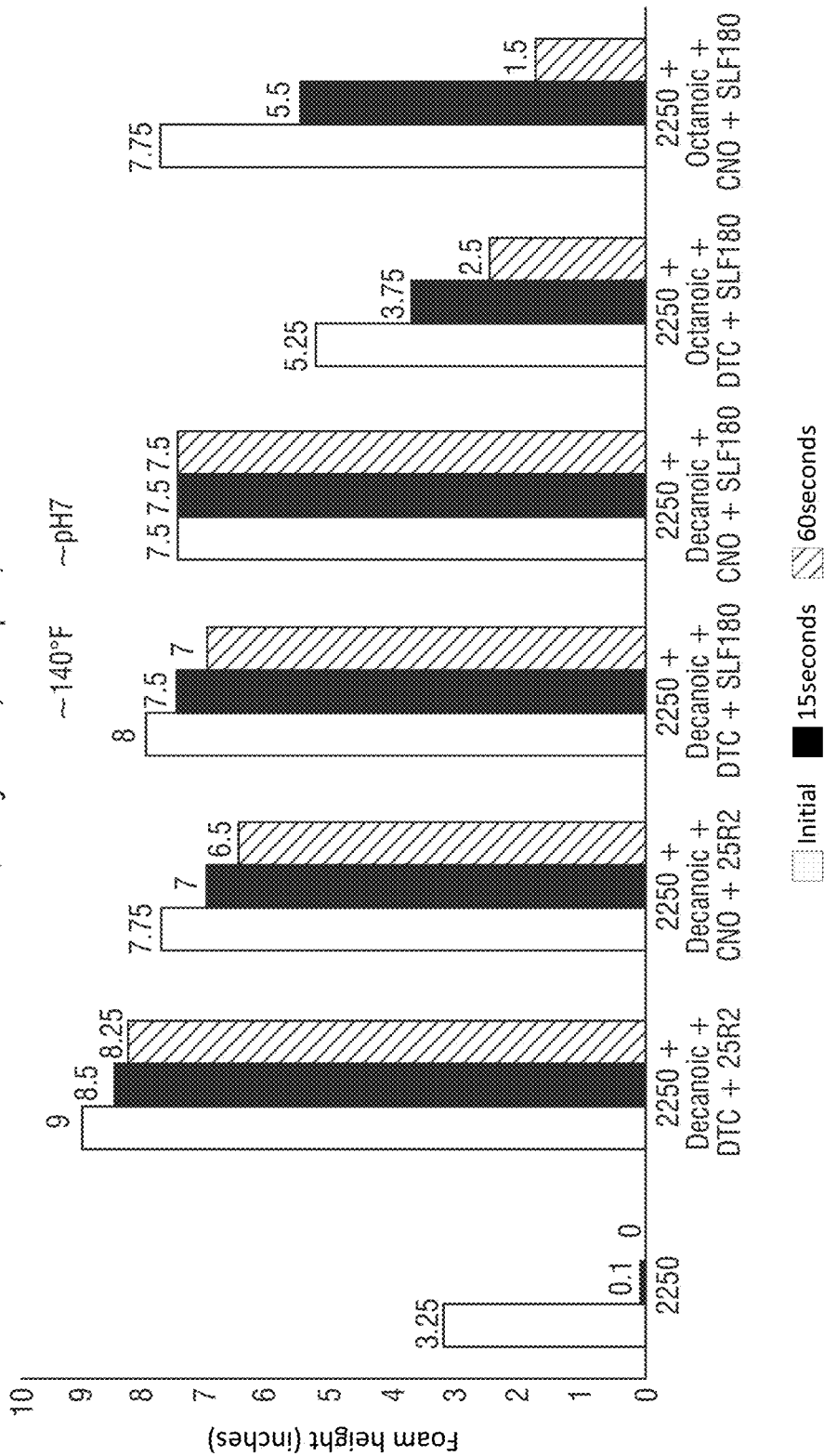
FIGS. 7-8 show graphical depictions of the average foam height of experimental solutions as described in Example 5 according to embodiments of the invention.
Figure 8:
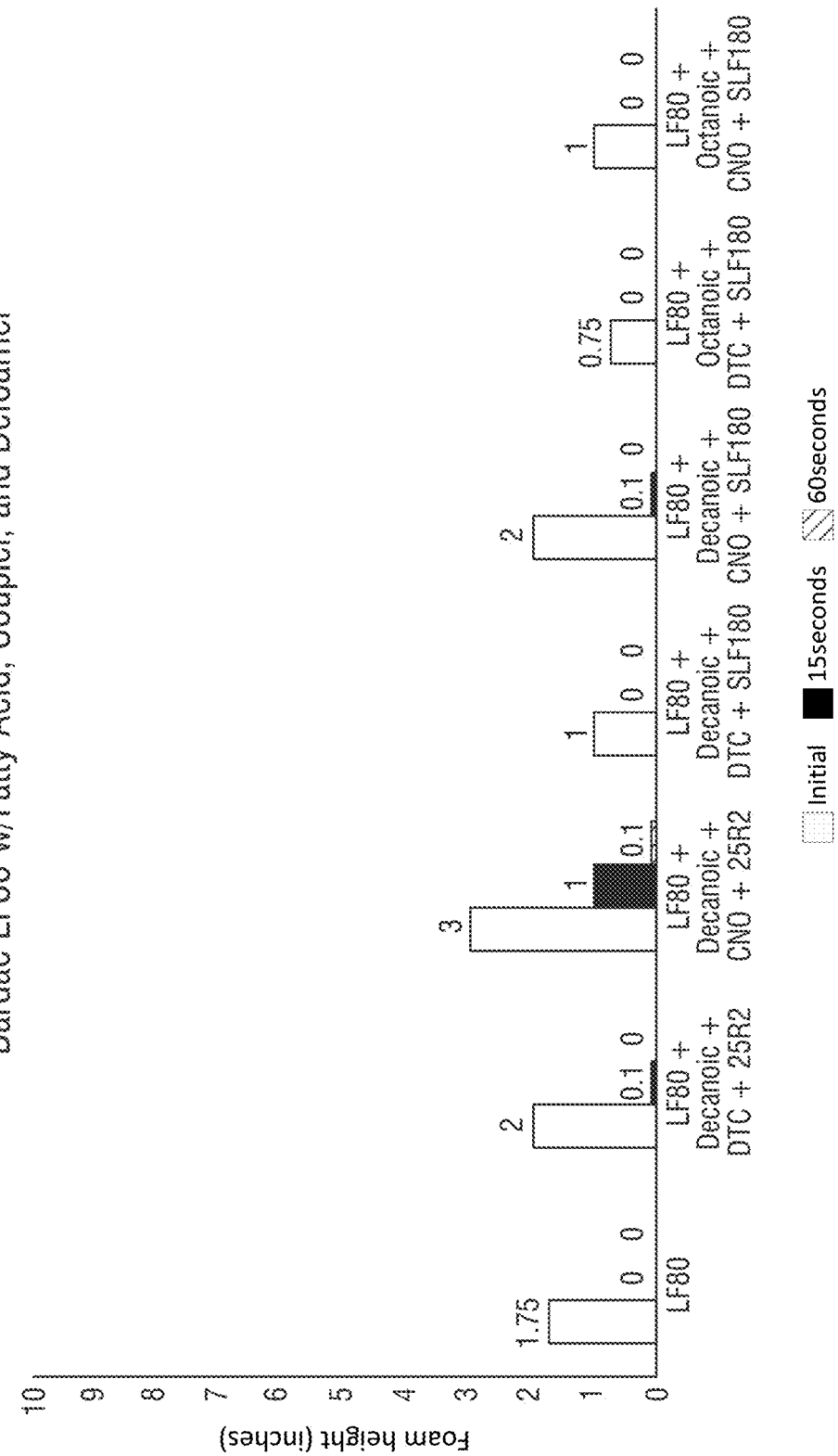

The inclusion of additional additives (defoamer and solubilizer/booster, such as Emulsogen) to the Quat-Anionic surfactant pairs were also analyzed, provided in Table 5 below (5A-5B), using the procedure described in Example 2. The Glewwe foam test results obtained from these experiments are shown in FIGS. 7-8.

TABLE 5

A

| Component | Composition 1 | Composition 2 | Composition 3 | Composition 4 | Composition 5 | Composition 6 | Composition 7 | Composition 8 |
|---|---|---|---|---|---|---|---|---|
| Bardac LF80 | 50 ppm | 50 ppm | 50 ppm | 50 ppm | | | | |
| Bardac 2250 | | | | | 50 ppm | 50 ppm | 50 ppm | 50 ppm |
| Decanoic Acid | 12.5 ppm | 12.5 ppm | 12.5 ppm | 12.5 ppm | 12.5 ppm | 12.5 ppm | 12.5 ppm | 12.5 ppm |
| Emulsogen CNO | 12.5 ppm | 12.5 ppm | | | 12.5 ppm | 12.5 ppm | | |
| Emulsogen DTC | | | 12.5 ppm | 12.5 ppm | | | 12.5 ppm | 12.5 ppm |
| Plurafac SLF180 | 50 ppm | | 50 ppm | | 50 ppm | | 50 ppm | |
| Pluronic 25R2 | | 50 ppm | | 50 ppm | | 50 ppm | | 50 ppm |

B

| Component | Composition 9 | Composition 10 | Composition 11 | Composition 12 | Composition 13 | Composition 14 | Composition 15 | Composition 16 |
|---|---|---|---|---|---|---|---|---|
| Bardac LF80 | 50 ppm | 50 ppm | 50 ppm | 50 ppm | | | | |
| Bardac 2250 | | | | | 50 ppm | 50 ppm | 50 ppm | 50 ppm |
| Octanoic Acid | 12.5 ppm | 12.5 ppm | 12.5 ppm | 12.5 ppm | 12.5 ppm | 12.5 ppm | 12.5 ppm | 12.5 ppm |
| Emulsogen CNO | 12.5 ppm | 12.5 ppm | | | 12.5 ppm | 12.5 ppm | | |
| Emulsogen DTC | | | 12.5 ppm | 12.5 ppm | | | 12.5 ppm | 12.5 ppm |
| Plurafac SLF180 | 50 ppm | | 50 ppm | | 50 ppm | | 50 ppm | |
| Pluronic 25R2 | | 50 ppm | | 50 ppm | | 50 ppm | | 50 ppm |

The data analyzing the Quat-Anionic surfactant pairs alone, clearly show the limited ability of the compositions according to the invention to provide low or no foaming applications as desired. Only when we go to the lowest foam quat, Bardac LF80, then defoaming becomes more effective (Compositions 1-4 and 9-12).

Example 6

Dynamic Surface Tension of Quat-Anionic Surfactant Compositions

Another surface tension test was run using the procedure described in Example 1. To determine the effects of additional components (defoamer and solubilizer) on the surface activity on Quat-Anionic surfactant pairs, a variety of compositions were tested and are provided in Table 5A-5B and Table 6. The results provided in FIG. 9-14 and summarized in Table 7A-7B below.

The data shows the importance of the Anionic surfactant for improved surface tension, in addition to the roll of the other additives. As can be seen, the Solubilizing agent also dynamically boosts surface activity in combination with the Quat-Anionic surfactant pairs. The synergistic data is shown in the greatest DST reduction from the quat and C8-C10 alkyl anionic surfactant.

Example 7

7-Cycle Ware Washing Performance

To test the ability of two experimental compositions, shown in Table 8A-8B below, as suitable rinse aids, twelve 10 oz. Libbey heat resistant glass tumblers were analyzed using the following procedure. The glass tumblers were cleaned prior to use.

TABLE 6

| Component | Comp. 17 | Comp. 18 | Comp. 19 | Comp. 20 | Comp. 21 | Comp. 22 | Comp. 23 | Comp. 24 |
|---|---|---|---|---|---|---|---|---|
| Bardac LF80 | 50 ppm | 50 ppm | 50 ppm | 50 ppm | | | | |
| Bardac 2250 | | | | | 50 ppm | 50 ppm | 50 ppm | 50 ppm |
| Decanoic Acid | 12.5 ppm | | 12.5 ppm | | 12.5 ppm | | 12.5 ppm | |
| Octanoic Acid | | 12.5 ppm | | 12.5 ppm | | 12.5 ppm | | 12.5 ppm |
| Emulsogen CNO | 12.5 ppm | 12.5 ppm | | | 12.5 ppm | 12.5 ppm | | |
| Emulsogen DTC | | | 12.5 ppm | 12.5 ppm | | | 12.5 ppm | 12.5 ppm |

TABLE 7A

| Quaternary Ammonium Compound | Bardac LF80 | | Bardac 2250 | |
|---|---|---|---|---|
| Anionic Surfactant | Decanoic Acid | | Decanoic Acid | |
| Solubilizer | CNO | DTC | CNO | DTC |
| Quat Alone | 69 | 69 | 59 | 59 |
| Quat + Anionic Surfactant | 49.5 | 49.5 | 34 | 34 |
| Quat + Anionic Surfactant + Secondary anionic surfactant (Solubilizer) | 43.5 | 43 | 26 | 28 |
| Adding single nonionic defoamer: | /////// | //////////// | ///////// | //////////// |
| Pluronic 25R2 | 42 | 42 | 33 | 30.5 |
| Plurafac SLF-180 | 40 | 36 | 30.5 | 27 |

TABLE 7B

| Quaternary Ammonium Compound | Bardac LF80 | | Bardac 2250 | |
|---|---|---|---|---|
| Anionic Surfactant | Octanoic Acid | | Octanoic Acid | |
| Solubilizer | CNO | DTC | CNO | DTC |
| Quat Alone | 69 | 69 | 59 | 69 |
| Quat + Anionic Surfactant | 55 | 55 | 37 | 37 |
| Quat + Anionic Surfactant + Secondary anionic surfactant (Solubilizer) | 52.5 | 52.5 | 41 | 34 |
| Adding single nonionic defoamer: | /////// | //////////// | ///////// | //////////// |
| Pluronic 25R2 | 44.5 | 44 | 39 | 37.5 |
| Plurafac SLF-180 | 46 | 36 | 37.5 | 35 |

TABLE 8A

Experimental Formula #1

| ppm | Addition Order | Material | Wt. % |
|---|---|---|---|
| 25 | 1 | Bardac LF80 | 13.75 |
| 12.5 | 2 | Decanoic Acid | 2.5 |
| 17.6 | 3 | Emulsogen CNO | 4 |
| 48.5 | 4 | Plurafac SLF180 | 11 |
| | 5 | DI Water | 66.05 |
| 11.9 | 6 | HEDP, 60% | 2.7 |
| | | | 100 |

TABLE 8B

Experimental Formula #2

| ppm | Addition Order | Material | Wt. % |
|---|---|---|---|
| 25 | 1 | Bardac LF80 | 5.5 |
| 25 | 2 | Bardac 2250 | 5.5 |
| 12.5 | 3 | Decanoic Acid | 2.5 |
| 12.5 | 4 | Emulsogen CNO | 2.5 |
| | 5 | DI water | 81.3 |
| 11.9 | 6 | HEDP, 60% | 2.7 |
| | | | 100 |

A food soil solution was prepared using 50/50 combination of beef stew and hot point soil. The concentration of the solution was about 2000 ppm. The soil included two cans of Dinty Moore Beef Stew (1360 grams), one large can of tomato sauce (822 grams), 15.5 sticks of Blue Bonnet Margarine (1746 grams) and powered milk (436.4 grams).

The dishmachine was then filled with an appropriate amount of water. After filling the dishmachine with water, the heaters were turned on. The final rinse temperature was adjusted to about 180° F. The glasses were soiled by rolling the glasses in a 1:1 (by volume) mixture of Campbell's cream of Chicken Soup: Kemp's Whole Milk three times. The glasses were then placed in an oven at about 160° F. for about 8 minutes. While the glasses were drying the dishmachine was primed with about 120 grams of the food soil solution, which corresponds to about 2000 ppm of food soil in the pump.

The soiled glass tumblers were placed in the Raburn rack and the rack was placed inside the dishmachine. The dishmachine was then started and run through an automatic cycle. When the cycle ended, the top of the glass were mopped with a dry towel. The glass tumblers being tested for soil removal were removed and the soup/milk soiling procedure was repeated. The redeposition glass tumblers were not removed. At the beginning of each cycle, an appropriate amount of detergent and food soil were added to the wash tank to make up for the rinse dilution. The soiling and washing steps were repeated for seven cycles.

The glass tumblers were then graded for protein accumulation using Coomassie Brilliant Blue R stain followed by destaining with aqueous acetic acid and about 455 mL of 50% methanol in distilled water. The destaining solution consisted of 45% methanol and 10% acetic acid in distilled water. The amount of protein remaining on the glass tumblers after destaining was rated visually on a scale of 1 to 5. A rating of 1 indicated no protein was present after destaining. A rating of 2 indicated that random areas (barely perceptible) were covered with protein after destaining. A rating of 3 indicated that about a quarter of the surface was covered with protein after destaining. A rating of 4 indicated that about half of the glass surface was covered with protein after destaining. A rating of 5 indicated that the entire surface was coated with protein after destaining. S value refers to the visual rating for spotting and F value refers to the visual rating for filming on the ware surface.

Glasses are rated visually in the glass viewing area against a black background. The rating scale used is shown in Table 9 and the results in Table 10.

TABLE 9

| Rating | Spots | Film | Protein |
|---|---|---|---|
| 1 | No Spots | No Film | No Protein |
| 2 | Spots at random | 20% of surface covered in film | 20% remains |
| 3 | ¼ glass spotted | 40% of the surface covered in film | 40% remains |
| 4 | ½ glass spotted | 60% of the surface covered in film | 80% remains |
| 5 | Whole glass spotted | At least 805 of the surface covered in film | 100% remains |

TABLE 10

| | Detergent 1 | Full System 1 | Formula 1 |
|---|---|---|---|
| Coated Glasses (stained) | S: 1.56 F: 2.56 | S: 1.18 F: 1 | S: 1.25 F: 1.62 |
| Redeposited Glasses (stained) | Detergent 1 S: 1.5 F: 1.18 | Full System 1 S: 1.06 F: 1 | Formula 1 S: 1.37 F: 1 |
| Coated | Detergent 1 | Full System 1 | Formula 1 |

TABLE 10-continued

| | | | |
|---|---|---|---|
| Glasses (unstained) | S: 2 F: 1.625 | S: 2.0625 F: 4 | S: 1.68 F: 1.5 |
| Redeposited Glasses (unstained) | Detergent 1 S: 1.875 F: 1. | Full System 1 S: 2.625 F: 1 | Formula 1 S: 1.5 F: 1 |

Example 8

Low Temperature Warewash Sanitizing Rinse Test

The sanitizing efficiency was determined for the experimental formulas of Table 8A-8B using the following procedure:
1.) Set up low temperature ware wash machine to our specific settings (see 7-cycle procedure)
   a. Set water Temperature (120° F.)
   b. Check water Hardness (4-6 gpg)
   c. Set water flow rate
   d. Hand dose in chemistry, no need to set up (50 ppm Quat, 50 ppm Bleach)
   e. Watch these variables throughout tests
2.) Have 10 processed Libby glasses for each tested chemistry run
   a. 5 will be unwashed controls
   b. 5 will be washed to detect kill
3.) Have enough sterile tubs to hold glasses—supplied by Micro
   a. Max 20 glasses per tub, or 2 runs
4.) Have enough swabs to collect specimen—supplied by Micro
   a. Need 2 per run or 1 swab per 5 glasses
5.) Have 1 buffer solution tube per 5 glasses, 2 per run
6.) Have Micro bring in an E. coli suspension
7.) Get 10 glasses ready in easy reach
8.) Fill one glass, an inch from the top, with E. coli suspension
   a. Start timer for 10 minutes at this point
9.) Pour E. coli Suspension from first glass into second glass, from second glass into third, and so on
10.) Dip the top inch of each soiled glass into E. coli suspension to coat rim
11.) Set glasses upside down in a sterile tub and let dry for 10 minutes
12.) Swab 5 of the 10 glasses as your test control group
   a. Swab the entire inside of the glass in circular motion, the bottom-inside of glass, and the rim of each glass.
   b. Place swab in one of the buffer solution tubes
13.) Place the other 5 glasses in dish rack in the following orientation

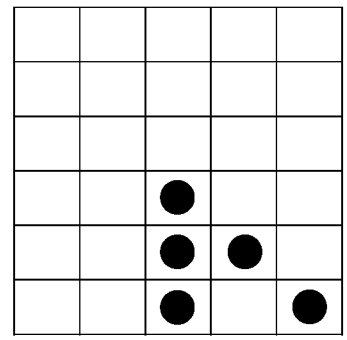

14.) Double check water temperature
15.) Hand dose in chemistry into machine
16.) Run the glasses through ONLY the rinse cycle portion of the ware wash cycle
   a. About 20 seconds
17.) Swab the 5 washed glasses
   a. Place swab in remaining buffer solution tube
18.) Repeat steps 7-15 for each remaining chemistry test run you would like to complete.
   a. 2-3 replicates per chemistry The results from these experiments are provided in Tables 11-13 (13A-13B) below.

TABLE 11

| Organism Inoculum Numbers | A | B | Average Inoculum (CFU/mL) |
|---|---|---|---|
| *Escherichia coli* ATCC 11229 | 34e7 | 28e7 | 3.1E+08 |
| Quat 50 ppm Glass Control Rep 1 | 32e4 | NA | 32e4 |
| Quat 50 ppm Glass Control Rep 2 | 19e4 | NA | 19e4 |
| Quat 50 ppm Glass Control 1 & 2 | 32e4 | 19e4 | 2.6E+05 |
| Quat 150 ppm Glass Control Rep 1 | 29e4 | NA | 29e4 |
| Quat 150 ppm Glass Control Rep 2 | 29e4 | NA | 29e4 |
| Quat 150 ppm Glass Control 1 & 2 | 29e4 | 29e4 | 2.9E+05 |
| Chlorine Glass Control 1 | 38e4 | NA | 38e4 |
| Chlorine Glass Control 2 | 29e4 | NA | 29e4 |
| Chlorine Glass Control 1 & 2 | 38e4 | 29e4 | 3.4E+05 |

TABLE 12

*Escherichia coli* ATCC 11229

| | Rinse Step (120 F.) | Rep1 Survivors CFU/mL | Rep 2 Survivors CFU/mL | Average CFU/mL | Log Reduction | Percent Reduction |
|---|---|---|---|---|---|---|
| Quat Rinse Aid (50 ppm quat) 1 | 20 sec | 20e1 | NA | 20e1 | 3.20 | 99.9375 |
| Quat Rinse Aid (50 ppm quat) 2 | 20 sec | 1e0 | NA | 1e0 | 5.28 | 99.9995 |
| Quat Rinse Aid (50 ppm quat) 1&2 | 20 sec | 20e1 | 1e0 | 1.0E+02 | 3.40 | 99.9606 |
| Quat Rise Aid (150 ppm quat) 1 | 20 sec | 1e0 | NA | 1e0 | 5.46 | 99.9997 |
| Quat Rise Aid (150 ppm quat) 2 | 20 sec | 1e0 | NA | 1e0 | 5.46 | 99.9997 |
| Quat Rise Aid (150 ppm quat) 1&2 | 20 sec | 1e0 | 1e0 | 1.0E+00 | 5.46 | 99.9997 |
| Chlorine (50 ppm NaOCl) 1 | 20 sec | 1e0 | NA | 1e0 | 5.58 | 99.9997 |
| Chlorine (50 ppm NaOCl) 2 | 20 sec | 1e0 | NA | 1e0 | 5.46 | 99.9997 |
| Chlorine (50 ppm NaOCl) 1&2 | 20 sec | 1e0 | 1e0 | 1.0E+00 | 5.53 | 99.9997 |

TABLE 13

A
(Swabbing of the glasses (*Escheria coli* ATCC 11229))

| Test Substance | Rinse Volume | Rinse Temperature | Plate Count | Plate Dilution | CFU/mL | CFU/swab (CFU/mL × 5) | $Log_{10}$ Growth | Avg. $Log_{10}$ Growth | $Log_{10}$ Reduction |
|---|---|---|---|---|---|---|---|---|---|
| 50 ppm Quat | 1.5 gal/rack | 120° F. | 1 | 1 | 1.00E+00 | 5.00E+00 | 0.70 | 0.70 | 6.23 |
| | | | 4 | 1 | 4.00E+00 | 2.00E+01 | 1.30 | 1.30 | 5.63 |
| | | | 1 | 1 | 1.00E+00 | 5.00E+00 | 0.70 | 0.70 | 6.23 |
| 25 ppm Quat | | | 27 | 1 | 2.70E+01 | 1.35E+02 | 2.13 | 2.13 | 4.80 |
| | | | 7 | 1 | 7.00E+00 | 3.50E+01 | 1.54 | 1.54 | 5.39 |
| | | | 14 | 1 | 1.40E+01 | 7.00E+01 | 1.85 | 1.85 | 5.08 |
| Untreated Controls | | | 97 | 10000 | 9.70E+05 | 4.85E+06 | 6.69 | 6.58 | |
| | | | 90 | 10000 | 9.00E+05 | 4.50E+06 | 6.65 | | |
| | | | 51 | 10000 | 5.10E+05 | 2.55E+06 | 6.41 | | |
| Inoculum Numbers | | | 60 | 10000000 | 6.00E+08 | | 8.78 | | |
| | | | 56 | 10000000 | 5.60E+08 | | 8.75 | 8.76 | |

TABLE 13-continued

| | | | B | | | | |
|---|---|---|---|---|---|---|---|
| | | | (Sampling from the sump (*Escherichia coli* ATCC 11229)) | | | | |
| Test Substance | Rinse Volume | Rinse Temperature | Plate Count | Plate Dilution | CFU/mL | CFU/swab (CFU/mL × 5) | $Log_{10}$ Growth |
| No Chemical Treatment | 1.5 gal/rack | 120° F. | 7 | 1 | 7.00E+00 | 3.50E+01 | 1.54 |
| 50 ppm Quat | | | 1 | 1 | 1.00E+00 | 5.00E+00 | 0.70 |
| 25 ppm Quat | | | 1 | 1 | 1.00E+00 | 5.00E+00 | 0.70 |

Quaternary ammonium compounds themselves are known to have superb micro efficacy, however, they are not very surface active material. When the quaternary ammonium compounds are paired with a suitable anionic surfactant, the combination is more surface active than the two individuals. The synergy in antimicrobial efficacy activation correlates quite well with dynamic surface tension synergy, except for the case of decanoate. The best antimicrobial synergy is with octanoate/octanoic acid or decanoate/decanoic acid in this study. Without being bound by theory, we believe that a complex, or ion pair, between a quat and anionic surfactant, because of the charge neutralization, has very similar effective cross-sectional areas for both the hydrophile and hydrophobe, making stacking in interfaces very favorable, unless they are not soluble any more. The complex formation is so favorable that it can overcome the cohesive force between fatty acid molecules.

Example 9

Analysis of Molar Ratio of Sanitizing Rinse Composition Components

Figure 15:
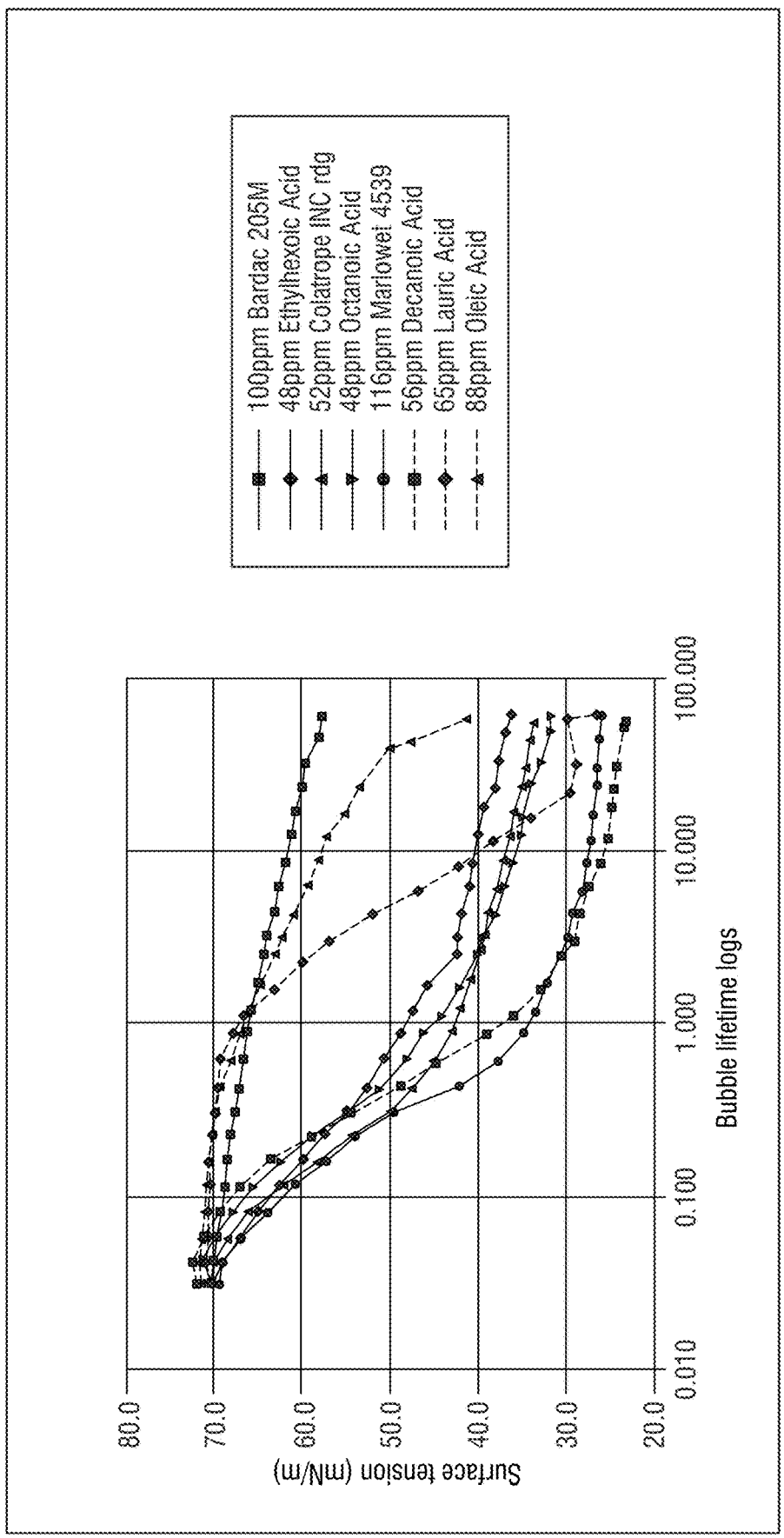
FIG. 15 shows a plot showing Dynamic Surface Tension of compositions prepared with a mole:mole ratio of Bardac 205M quaternary ammonium compound:anionic carboxylate surfactants.

The dynamic surface tension of a mole:mole ratio of quaternary ammonium compound with different anionic carboxylate surfactants is shown in FIG. 15. Bardac 205M at a concentration of 100 ppm as described above was combined each with 48 ppm ethylhexoic acid, 52 ppm Colatrope INC (sodium alkanoate available from Colonial Chemical Inc.), 48 ppm octanoic acid, 116 ppm Marolwet 4539 SLS (C9-alcohol polyethylene glycol ether carboxylic acid available from Sasol), 56 ppm decanoic acid, and 65 ppm lauric acid at a mole:mole ratio.

The results shown in FIG. 15 demonstrate that the combinations of carboxylated anionic surfactants and quaternary ammonium compounds have reduced surface activity as compared to the quaternary ammonium compound (Bardac 205M) alone.

Example 10

Analysis of Molar Ratio and pH of Sanitizing Rinse Composition Components

The surface tension of a combination of mole:mole ratio of quaternary ammonium compound:carboxylate based anionic surfactant was tested at different pH. Bardac 205M quaternary ammonium was combined with Marlowet 4539 (C9-alcohol polyethylene glycol ether carboxylic acid available from Sasol) on a mole:mole basis. The pH of the combination was adjusted using HCl and the surface tension of the combination at pH 4, 6, 9, and 9.5 was plotted for comparison against 100 ppm Bardac 205M and 116 ppm Marlowet 4539.

Figure 16:
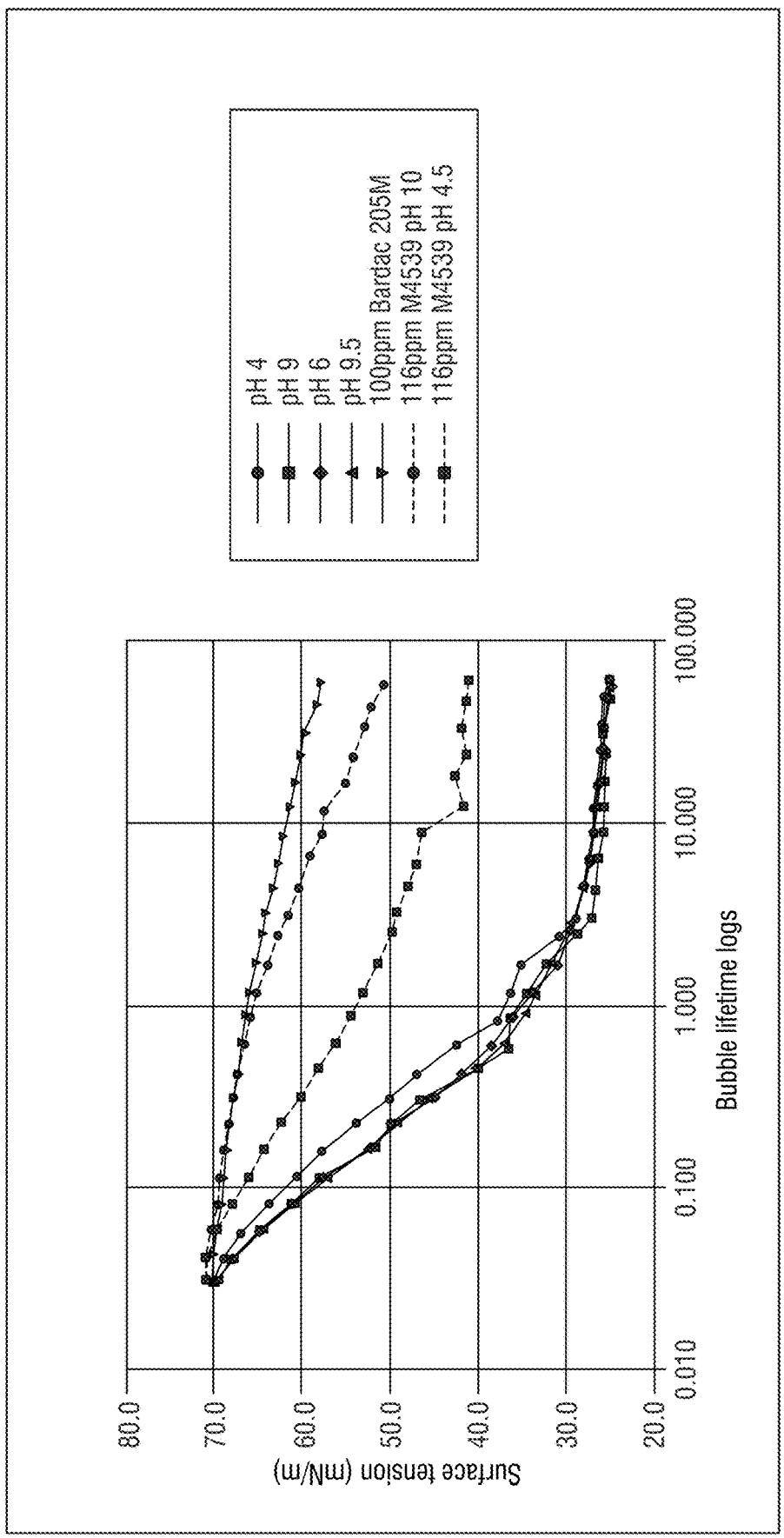
FIGS. 16-17 show plots of pH of the compositions prepared with quaternary ammonium compound and carboxylate based anionic surfactants on a molar ratio basis according to embodiments of the invention.
Figure 17:
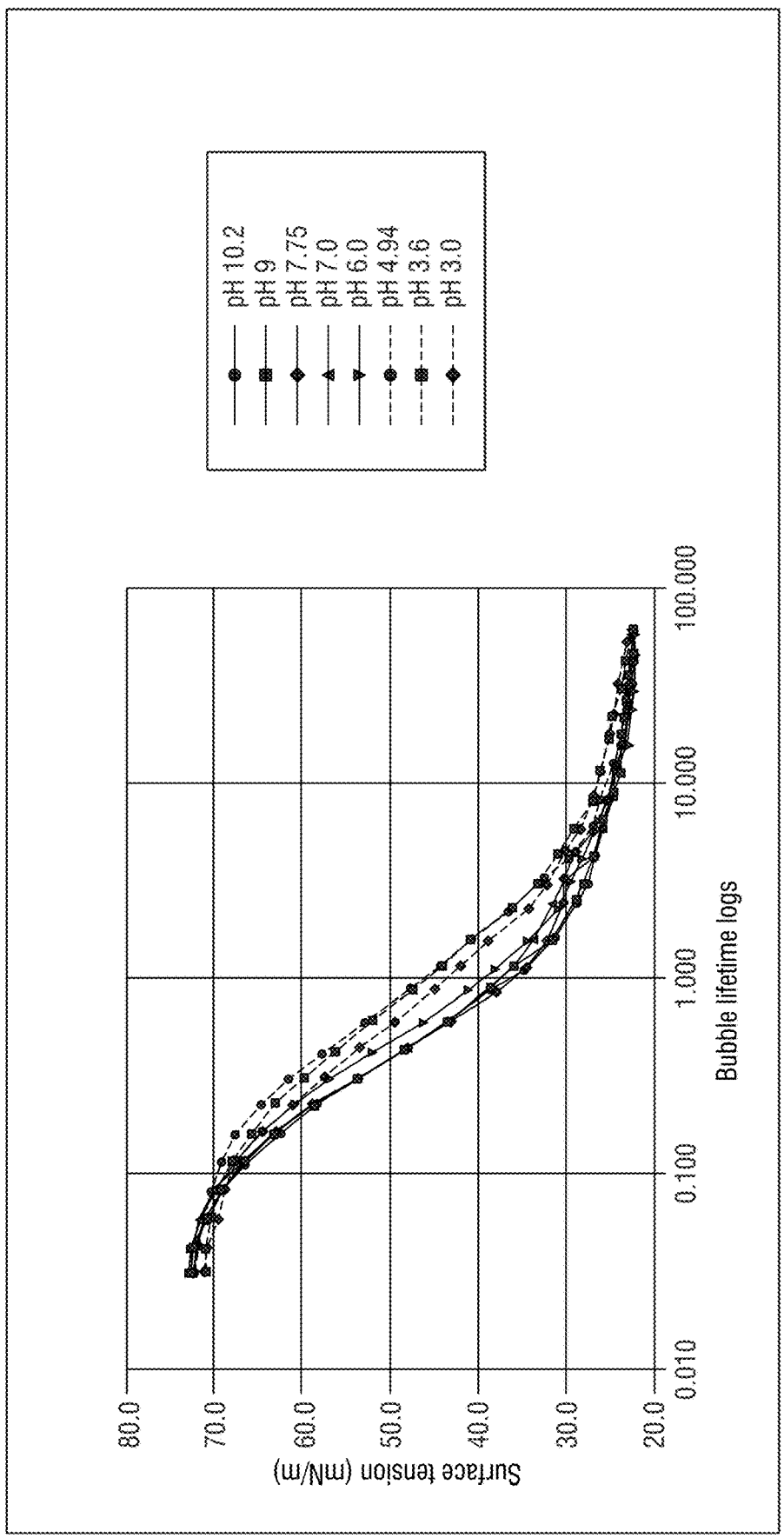

FIGS. 16-17 show that very good surface wetting (no change) from pH 3-9.5. That is, surface wetting is independent of pH. Without being bound by theory of the prevent invention, the data shows that a complex, or ion pair, between a quat and anionic surfactant exists as result of the charge neutralization, has very similar effective cross-sectional areas for both the hydrophile and hydrophobe, making stacking in interfaces very favorable, unless they are not soluble any more. The complex formation is so favorable that it can overcome the cohesive force between fatty acid molecules.

Example 11

Analysis of Exemplary synergy and activation of compositions according to the invention. Various compositions were evaluated and were based on a mole-mole ratio of Quaternary ammonium to anionic surfactant. The exemplary quaternary ammonium components that do not require any additional defoaming agents were evaluated, namely Bardac LF or Bardac 2080 in combination with various anionic surfactants as shown in Table 14A-B evaluating preferred surface activation and enhanced dynamic surface tension an Table 15A-4B evaluating preferred antimicrobial synergy (e.g. sanitizing rinse aid application).

TABLE 14

| (Surface Activation) Surface activation for molar or near molar ratios. | | | | | | | | |
|---|---|---|---|---|---|---|---|---|
| Linear | | | Branched | | | Alkoxylated | | |
| Synergy | No effect | Antagonistic | Synergy | No effect | Antagonistic | Synergy | No effect | Antagonistic |
| A | | | | | | | | |
| Carboxylate based anionic surfactants | | | | | | | | |
| C6-10 | — | C12+ | C6-10 | — | C14+ | C6-18 | — | if <2 AO |
| pH 1-12 | — | pH 5.5-12 | pH 1-12 | — | pH 5.5-12 | pH 1-12 | — | |

TABLE 14-continued (Surface Activation) Surface activation for molar or near molar ratios.

| Linear | | | Branched | | | Alkoxylated | | |
|---|---|---|---|---|---|---|---|---|
| Synergy | No effect | Antagonistic | Synergy | No effect | Antagonistic | Synergy | No effect | Antagonistic |
| B Sulfate/Sulfonate based anionic surfactants | | | | | | | | |
| C6-10 pH 1-12 | — — | C12+ pH 1-12 | C6-12 pH 1-12 | — — | C14+ pH 1-12 | C6-18 pH 1-12 | — — | if <4 AO — |

TABLE 15

(Antimicrobial Synergy) Antimicrobial activation for molar or near molar ratios

| Linear | | | Branched | | | Alkoxylated | | |
|---|---|---|---|---|---|---|---|---|
| Synergy | No effect | Antagonistic | Synergy | No effect | Antagonistic | Synergy | No effect | Antagonistic |
| A Carboxylate based anionic surfactants | | | | | | | | |
| C6-10 pH 1-5.5 | C6-10 pH 6-12 | C12+ pH 5.5-12 | C6-10 pH 1-12 | C6-10 pH 6-12 | C14+ pH 5.5-12 | C6-13 pH 1-5.5 | C14+ pH 5.5-12 | if <2 AO — |
| B Sulfate/Sulfonate based anionic surfactants | | | | | | | | |
| — — | C6-10 pH 1-12 | C12+ pH 1-12 | — — | C6-12 pH 1-12 | C14+ pH 1-12 | — — | C6-18 pH 1-12 | if <4 AO — |

As referred to in the Tables 14-15, "synergy" refers to the combination of surfactants being more surface active or enhanced micro efficacy compared to individual surfactants; "no effect" refers to the combination of surfactants behaving independent of anionic—behaves like quat alone; and "antagonistic" refers to the combination of surfactants are less surface active or reduced efficacy then individual surfactants. The reference to the amount of AO (amine oxide) in the anionic surfactants demonstrating non-preferred effects for the applications of the present invention, a skilled artisan will understand the evaluation shown in Tables 14-15 is limited by the measurements resulting from commercially available surfactants at the time of evaluation.

Beneficially, according to the invention for surface wetting alone (i.e. none-sanitizing applications) all quat-anionic mixtures are suitable for formulations as the primary driver for the compositions is wetting/sheeting/rinseablility.

Example 12

Hard Surface Sanitizing Hard Water pH Study

Additional testing was done analyzing the antimicrobial efficacy of the Quat-Anionic surfactant blend in various pH conditions with hard water. The compositions (and control without both the quaternary ammonium compound and anionic surfactant), evaluated conditions and results are provided in Tables 16-20.

TABLE 16

| Inoculum Numbers (CFU/mL) | Plate 1 | Plate 2 | Plate 3 |
|---|---|---|---|
| *Escherichia coli* AATCC 11229 | 1.25E+08 | 1.68E+08 | 1.50E+10 |

TABLE 17

Sanitizing Formula #1

| Material | Wt % |
|---|---|
| Bardac LF80 | 13.75 |
| Decanoic Acid | 2.5 |
| Emulsogen CNO | 4 |
| Plurafac SLF180 | 11 |
| HEDP, 60% | 2.7 |
| DI Water | 66.05 |

TABLE 18

Sanitizing Formula #2

| Material | Wt % |
|---|---|
| Bardac LF80 | 13.75 |
| NAS-FAL | 3.5 |
| Emulsogen CNO | 4 |
| Plurafac SLF180 | 11 |
| HEDP, 60% | 2.7 |
| DI Water | 65.05 |

TABLE 19

| Test | Test Substance | Rinse Volume | Rinse Temp. | CFU/mL | CFU/swab (CFU/mL × 5) | Log10 Growth | Log10 Reduction |
|---|---|---|---|---|---|---|---|
| 1 | 500 ppm Formula #1 | 1.7 gal/ rack | 118-120° F. | 1.07E+02 | 5.40E+02 | 2.73 | 3.38 |
|   |   |   |   | <1.00 | <5.00 | <0.70 | >5.41 |
| 2 | 500 ppm Formula #1 |   |   | <1.00 | <5.00 | <0.70 | >5.51 |
|   |   |   |   | <1.00 | <5.00 | <0.70 | >5.51 |
| 3 | 500 ppm Formula #2* |   |   | 5.00E+03 | 2.50E+04 | 4.4 | 1.92 |
|   |   |   |   | 1.60E+01 | 8.00E+01 | 1.9 | 4.42 |
| 4 | 100 ppm Formula #2 |   |   | <1.00 | <5.00 | <0.70 | >5.62 |
|   |   |   |   | <1.00 | <5.00 | <0.70 | >5.62 |
| Untreated Control Counts |   | 1 |   | 2.50E+05 | 1.30E+06 | 6.11 | NA |
|   |   | 2 |   | 3.20E+05 | 1.60E+06 | 6.2 | NA |
|   |   | 3 |   | NT | NT | NT | NA |
|   |   | 4 |   | 4.10E+05 | 2.10E+06 | 6.32 | NA |
| Swab from Uninoculated Control Glass |   |   |   | <1.00 | <5.00 | <0.70 | NA |

TABLE 20

| Test | Test Substance | Rinse Volume | Rinse Temp. | CFU/mL | CFU/sample (CFU/mL × 5) | Log10 Growth |
|---|---|---|---|---|---|---|
| *Escherichia Coli* ATCC 11229 | | | | | | |
| 1 | 50 ppm Formula #1 | 1.7 gal/ rack | 118-120° F. | <1.00 | <5.00 | <0.70 |
| 2 | 100 ppm Formula #1 |   |   | <1.00 | <5.00 | <0.70 |
| 3 | 50 ppm Formula #2 |   |   | <1.00 | <5.00 | <0.70 |

As shown in Tables 19-20 the unexpected results show that even at very hard water condition (15 grains per gallon, or 2565 ppm water hardness) the combination of the quat/anionic compositions, as shown the quat/decanoic, provides 5 log kill of the more challenging *E. coli*, at as low as 50 ppm di-octyl quat level. This confirms that quat/anionic is very efficacious against microbes that are deposited on hard surfaces, even under very hard water condition, and at pH neutral or above. The sampling from the sump confirms that the microbes are killed, not just removed from the surfaces.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A concentrated antimicrobial rinse aid composition consisting of:
   about 11 wt. % to about 30 wt. % of an antimicrobial quaternary ammonium compound consisting of a $C_{12}$-$C_{16}$ alkyl dimethyl benzyl ammonium chloride, didecyl dimethyl ammonium chloride, dioctyl dimethyl ammonium chloride, octyl decyl dimethyl ammonium chloride, or a combination thereof;
   from about 0.1 wt. % to about 20 wt. % of an anionic surfactant consisting of octanoic acid, decanoic acid, ethylhexanoic acid, lauric acid, or a combination thereof; and
   the remainder of the composition is an additional functional ingredient consisting of a thickener, viscosity modifier, solvent, solubility modifier, humectant, metal protecting agent, stabilizing agent, corrosion inhibitor, solidifying agent, sheeting agent, colorant, odorant, perfume, hydrotrope, coupler, defoamer, or a combination thereof;
   wherein the antimicrobial quaternary ammonium compound and the anionic surfactant form a complex without requiring nonionic surfactants, sequestrants, or chelating agents; and
   wherein the composition has a pH of 1 to 6.

2. The composition of claim 1, wherein the quaternary ammonium compound is a $C_{12}$-$C_{16}$ alkyl dimethyl benzyl ammonium chloride, and wherein the anionic surfactant is decanoic acid.

3. The composition of claim 1, wherein the molar ratio of the anionic surfactant to the quaternary ammonium compound is from about 2 moles anionic surfactant to about 1 mole quaternary ammonium compound to about 1 mole anionic surfactant to 10 moles quaternary ammonium compound.

4. The composition of claim 1, wherein the composition provides in a use solution from about 25 ppm to about 400 ppm of the quaternary ammonium compound and from about 1 ppm and about 50 ppm of the anionic surfactant.

5. The composition of claim 1, wherein the composition has a pH of about 1 to about 3 when diluted in a use solution.

6. The composition of claim 1, wherein the composition has a pH of about 1 to about 5.5 when diluted in a use solution.

\* \* \* \* \*